(12) United States Patent
Shoa Hassani Lashdan et al.

(10) Patent No.: US 10,284,810 B1
(45) Date of Patent: May 7, 2019

(54) USING LOW-RESOLUTION FRAMES TO INCREASE FRAME RATE OF HIGH-RESOLUTION FRAMES

(71) Applicant: QUALCOMM Incorporated, San Diego, CA (US)

(72) Inventors: Alireza Shoa Hassani Lashdan, Burligton (CA); Justin Wong, Markham (CA); Xiaojian Liu, Burlington (CA); Louie Lee Toy, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/807,078

(22) Filed: Nov. 8, 2017

(51) Int. Cl.
*H04N 7/01* (2006.01)
(52) U.S. Cl.
CPC ........... *H04N 7/0127* (2013.01); *H04N 7/014* (2013.01)
(58) Field of Classification Search
None
See application file for complete search history.

(56) References Cited

U.S. PATENT DOCUMENTS

| 6,233,279 | B1 * | 5/2001 | Boon | G06T 9/20 |
| | | | | 375/240.08 |
| 6,453,077 | B1 * | 9/2002 | Kim | G06T 3/4007 |
| | | | | 382/247 |
| 8,086,050 | B2 * | 12/2011 | Schwartz | G06T 7/194 |
| | | | | 345/555 |
| 8,558,948 | B2 * | 10/2013 | Jia | G06T 1/00 |
| | | | | 348/441 |
| 9,258,518 | B2 * | 2/2016 | Salvador | G06T 3/4053 |
| 9,600,860 | B2 * | 3/2017 | Perez Pellitero | G06T 3/4053 |

(Continued)

OTHER PUBLICATIONS

Anagün Y., et al., "Super Resolution Using Variable Size Block-Matching Motion Estimation with Rotation", IEEE International Symposium on Innovations in Intelligent Systems and Applications, Jul. 2012, pp. 1-5.

(Continued)

*Primary Examiner* — Brian P Yenke
*Assistant Examiner* — Sean N. Haiem
(74) *Attorney, Agent, or Firm* — Shumaker & Sieffert, P.A.

(57) ABSTRACT

A device obtains a plurality of original high-resolution frames and a low-resolution frame. The device generates, based on the plurality of original high-resolution frames, a first additional high-resolution frame. The first additional high-resolution frame and the low-resolution frame correspond to a same output time. The device generates a down-sampled frame by down-sampling the first additional higher-resolution frame. Additionally, the device determines, based on comparisons of blocks of the low-resolution frame and blocks of the down-sampled frame, a plurality of weights. The device generates an up-sampled frame by up-sampling the low-resolution frame. The device generates a second additional high-resolution frame based on a weighted average of the up-sampled frame and the first additional high-resolution frame. The weighted average is based on the plurality of weights. The second additional high-resolution frame corresponds to the same output time as the first additional high-resolution frame and the low-resolution frame.

18 Claims, 12 Drawing Sheets

(56) References Cited

U.S. PATENT DOCUMENTS

| | | | |
|---|---|---|---|
| 10,134,110 B1* | 11/2018 | Liu | G06T 3/4069 |
| 2006/0268991 A1* | 11/2006 | Segall | H04B 1/66 |
| | | | 375/240.24 |
| 2007/0019887 A1* | 1/2007 | Nestares | G06T 3/4053 |
| | | | 382/299 |
| 2007/0217713 A1* | 9/2007 | Milanfar | G06T 3/4053 |
| | | | 382/299 |
| 2009/0245375 A1* | 10/2009 | Liu | G06T 3/4053 |
| | | | 375/240.16 |
| 2011/0109794 A1* | 5/2011 | Wiercienski | G06T 3/4053 |
| | | | 348/441 |
| 2011/0141348 A1* | 6/2011 | Jia et al. | G06T 3/4053 |
| | | | 348/441 |
| 2011/0149150 A1* | 6/2011 | Jia | G06T 1/00 |
| | | | 348/452 |
| 2012/0314975 A1* | 12/2012 | Shin | H04N 7/0117 |
| | | | 382/299 |
| 2014/0177706 A1* | 6/2014 | Fernandes | H04N 19/463 |
| | | | 375/240.03 |
| 2015/0104116 A1* | 4/2015 | Salvador | G06T 3/4053 |
| | | | 382/300 |
| 2018/0020229 A1* | 1/2018 | Chen | H04N 19/51 |

OTHER PUBLICATIONS

Beeler, et al., "Asynchronous Spacewarp," Oculus, Nov. 10, 2016, 7 pp.

Brandi, et al., Super resolution of video using key frames, ISCAS 2008, May 18-21, 2008, pp. 1608-1611.

Li, et al., "Bilateral video super resolution using non-local means with adaptive parameters," ICIP 2016, Sep. 25-28, 2016, pp. 1155-1159.

U.S. Appl. No. 15/807,100, filed by Alireza Shoa Hassani Lashdan, filed Nov. 8, 2017.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

* cited by examiner

USING LOW-RESOLUTION FRAMES TO INCREASE FRAME RATE OF HIGH-RESOLUTION FRAMES

TECHNICAL FIELD

This disclosure relates to devices and techniques for video processing.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC) standard, and extensions of such standards. The video devices may transmit, receive, encode, decode, and/or store digital video information more efficiently by implementing such video compression techniques.

High frame rate in video is desirable in various applications. For example, use of a high frame rate may reduce motion judder in fast scene panning or fast object motion. Movies filmed at 24 frames per second (fps) appear smoother when rate up converted to 60 or 120 fps. High-motion sports videos have greater clarity and smoothness when rate upconverted. In another example, use of a high frame rate may reduce the chances of headache and improve user experience in virtual reality (VR) applications especially when VR headsets need to compensate quickly for head motion. However, high frame rate bitstreams of encoded video data may be very large, especially if the frames are high resolution. Additionally, it may be difficult for a video decoder to decode high-resolution frames fast enough to sustain the high frame rate.

SUMMARY

In general, this disclosure describes techniques to improve the ability of devices to produce high-quality high-resolution frames from existing high-resolution frames. In accordance with a technique of this disclosure, a device obtains a series of high-resolution frames interleaved with low-resolution frames. For example, there may be one or more low-resolution frames between each of the high-resolution frames. To increase the frame rate of high-resolution frames, the device interpolates or extrapolates a first new high-resolution frame based on two or more of the existing high-resolution frames. The first new high-resolution frame has the same output time as one of the low-resolution frames. The device may then down-sample the first new high-resolution frame to a resolution of the low-resolution frame. Additionally, the device may compare blocks of the down-sampled frame and blocks of the low-resolution frame to determine a set of weights. The device also up-samples the low-resolution frame to a resolution of the high-resolution frames. The device generates a second new high-resolution frame. To generate the second new high-resolution frame, the device uses the weights in computing weighted averages of blocks in the first new high-resolution frame and blocks in the up-sampled frame. The device may output the second new high-resolution frame with the original high-resolution frames.

In one aspect, this disclosure further describes techniques for improving video compression. In this aspect, an encoding device may generate a synthetic frame based on a plurality of source frames, wherein the synthetic frame and a target frame correspond to a same particular output time. Furthermore, for each block of the target frame, the device may determine, based on a comparison of the block of the target frame and a corresponding block of the synthetic frame, a weight for the block of the target frame. The device then determines, based on the weight for the block of the target frame relative to a predetermined threshold, whether to change pixels of the block of the target frame to a fixed value. The device may output data comprising a representation of the block of the target frame and the weight for the block of the target frame.

In accordance this this aspect, a device may obtain the data comprising the representation of the plurality of source frames and the target frame. Additionally, the device may generate a first synthetic frame based on the plurality of source frames. For each target frame block of the target frame, the device may obtain a representation of a weight for the target frame block. For each of the target frame blocks, the device may generate, in a second synthetic frame, a synthetic block corresponding to the target frame block. The first synthetic frame, the second synthetic frame, and the target frame correspond to a same particular output time. As part of generating the synthetic block corresponding to the target frame block, the device may calculate, for each pixel of the target frame block, a value of a pixel of the synthetic block corresponding to the target frame block as being equal to $w \cdot s_1 + (1-w) \cdot s_2$, where w is the weight for the target frame block, $s_1$ is a value of the pixel of the target frame and $s_2$ is a value of a pixel of the first synthetic frame corresponding to the pixel of the target frame block.

In one example, this disclosure describes, a method of increasing a frame rate of video data performed by one or more devices, the method comprising: obtaining a plurality of original higher-resolution frames and a lower-resolution frame, each of the plurality of original higher-resolution frames having a first resolution, the lower-resolution frame having a second resolution lower than the first resolution; generating, based on the plurality of original higher-resolution frames, a first additional higher-resolution frame, the first additional higher-resolution frame having the first resolution, the first additional higher-resolution frame and the lower-resolution frame corresponding to a same particular output time; generating a down-sampled frame by down-sampling the first additional higher-resolution frame, the down-sampled frame having the second resolution; determining, based on comparisons of blocks of the lower-resolution frame and blocks of the down-sampled frame, a plurality of weights; generating an up-sampled frame by up-sampling the lower-resolution frame, the up-sampled frame having the first resolution; and generating a second additional higher-resolution frame based on a weighted average of the up-sampled frame and the first additional higher-resolution frame, wherein the weighted average is based on the plurality of weights, and wherein the second additional higher-resolution frame corresponds to the particular output time.

In another example, this disclosure describes a device comprising: a memory configured to store a plurality of original higher-resolution frames and a lower-resolution frame, each of the plurality of original higher-resolution frames having a first resolution, the lower-resolution frame having a second resolution lower than the first resolution; and one or more processing circuits configured to: generate, based on the plurality of original higher-resolution frames, a first additional higher-resolution frame, the first additional higher-resolution frame having the first resolution, the first additional higher-resolution frame and the lower-resolution frame corresponding to a same particular output time; generate a down-sampled frame by down-sampling the first additional higher-resolution frame, the down-sampled frame having the second resolution; determine, based on comparisons of blocks of the lower-resolution frame and blocks of the down-sampled frame, a plurality of weights; generate an up-sampled frame by up-sampling the lower-resolution frame, the up-sampled frame having the first resolution; and generate a second additional higher-resolution frame based on a weighted average of the up-sampled frame and the first additional higher-resolution frame, wherein the weighted average is based on the plurality of weights, wherein the second additional higher-resolution frame corresponds to the particular output time.

In another example, this disclosure describes a device comprising: means for storing a plurality of original higher-resolution frames and a lower-resolution frame, each of the plurality of original higher-resolution frames having a first resolution, the lower-resolution frame having a second resolution lower than the first resolution; means for generating, based on the plurality of original higher-resolution frames, a first additional higher-resolution frame, the first additional higher-resolution frame having the first resolution, the first additional higher-resolution frame and the lower-resolution frame corresponding to a same particular output time; means for generating a down-sampled frame by down-sampling the first additional higher-resolution frame, the down-sampled frame having the second resolution; means for determining, based on comparisons of blocks of the lower-resolution frame and blocks of the down-sampled frame, a plurality of weights; means for generating an up-sampled frame by up-sampling the lower-resolution frame, the up-sampled frame having the first resolution; and means for generating a second additional higher-resolution frame based on a weighted average of the up-sampled frame and the first additional higher-resolution frame, wherein the weighted average is based on the plurality of weights, wherein the second additional higher-resolution frame corresponds to the particular output time.

In another example, this disclosure describes a computer-readable data storage medium having instructions stored thereon that, when executed, cause one or more processing circuits to: obtain a plurality of original higher-resolution frames and a lower-resolution frame, each of the plurality of original higher-resolution frames having a first resolution, the lower-resolution frame having a second resolution lower than the first resolution; generate, based on the plurality of original higher-resolution frames, a first additional higher-resolution frame, the first additional higher-resolution frame having the first resolution, the first additional higher-resolution frame and the lower-resolution frame corresponding to a same particular output time; generate a down-sampled frame by down-sampling the first additional higher-resolution frame, the down-sampled frame having the second resolution; determine, based on comparisons of blocks of the lower-resolution frame and blocks of the down-sampled frame, a plurality of weights; generate an up-sampled frame by up-sampling the lower-resolution frame, the up-sampled frame having the first resolution; and generate a second additional higher-resolution frame based on a weighted average of the up-sampled frame and the first additional higher-resolution frame, wherein the weighted average is based on the plurality of weights, wherein the second additional higher-resolution frame corresponds to the particular output time.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
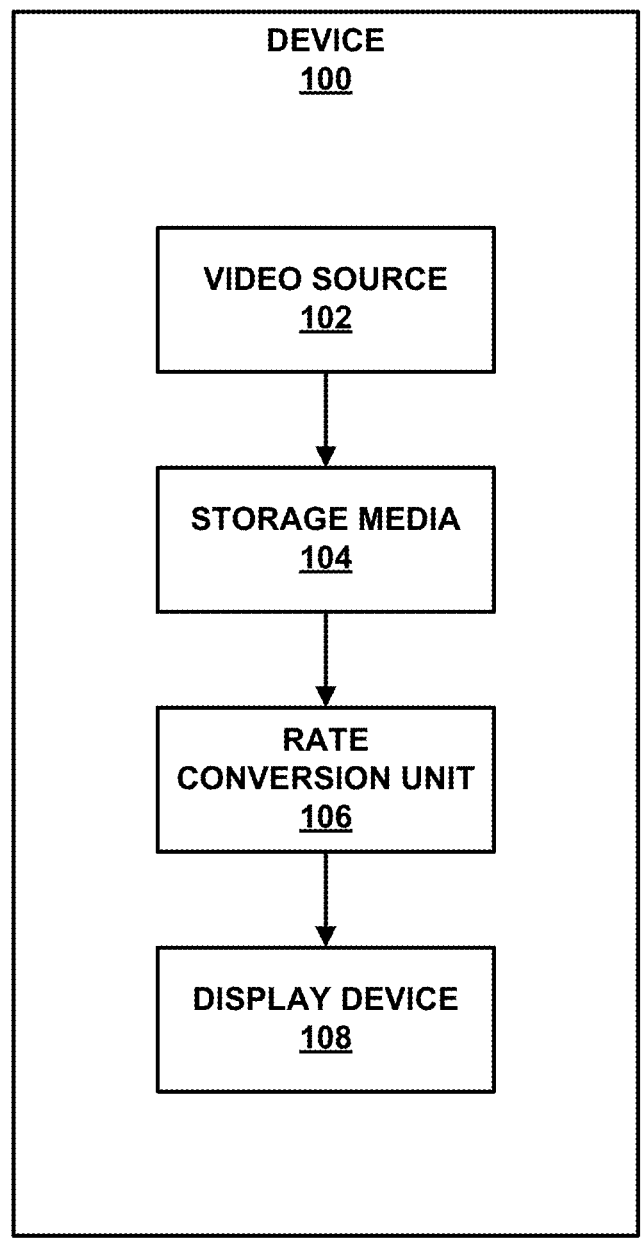
FIG. 1 is a block diagram illustrating an example device that may implement techniques of this disclosure.

In certain applications, being able to provide video comprising high-resolution frames at a high frame rate is important for user enjoyment of the video. For example, a user may perceive motion judder in video when the frame rate is too low. In another example, in virtual reality applications, users can experience headaches or nausea if the frame rate is too low. Moreover, in virtual reality applications, users do not feel that a scene is real if the resolution is too low.

However, increasing the bitrate of encoded video data such that the video data includes more encoded high-resolution frames may be impractical because of bandwidth constraints or data transfer limit constraints. Additionally, it may be expensive or impractical to implement a video decoder or graphics engine capable of rendering high-resolution frames at a sufficiently high frame rate.

Previously-proposed techniques for addressing this challenge have involved a device rendering a series of high-resolution frames and extrapolating or interpolating additional high-resolution frames from the decoded high-resolution frames. The device may output both the decoded high-resolution frames and the extrapolated or interpolated high-resolution frames, thereby increasing the effective frame rate. However, the extrapolation or interpolation process may introduce serious visual artifacts in extrapolated or interpolated frames. For instance, if the series of decoded frames show an object moving across a background, parts of the background revealed after the object has passed may need to be filled in with neighboring pixels. However, filling in revealed parts of the background with neighboring pixels may create distortions. In another example, the actual motion of an object may be different than what was extrapolated, resulting in incorrect image.

Techniques of this disclosure may address these challenges. As described herein, a device obtains a plurality of original higher-resolution frames and lower-resolution frames. Each of the plurality of original higher-resolution frames has a first resolution. The lower-resolution frames have a second resolution lower than the first resolution. The device generates a first additional higher-resolution frame based on the plurality of original higher-resolution frames. In some examples, the device uses extrapolation or interpolation to generate the first additional higher-resolution frame. The first additional higher-resolution frame has the same resolution as the original higher-resolution frames. The first additional higher-resolution frame and one of the lower-resolution frames correspond to a same output time. Additionally, the device down-samples the first additional higher-resolution frame to the second resolution. The device may then determine a plurality of weights. The device may determine the weights by comparing blocks of the lower-resolution frame and blocks of the down-sampled frame. The device may then up-sample the lower-resolution frame to the first resolution. Next, the device generates a second additional higher-resolution frame based on a weighted average of the up-sampled frame and the first additional higher-resolution frame. The weighted average is based on the plurality of weights. The second additional higher-resolution frame has the same output time as the lower-resolution frame and the first additional higher-resolution frame.

As a result, the device may use pixels of lower-resolution frames to fill in revealed background areas or otherwise correct defects in extrapolated or interpolated frames. The use of pixels from lower-resolution frames does not result in the serious visual artifacts that may result from filling revealed background areas with neighboring pixels. Rather, a viewer may perceive the lower-resolution pixels as motion blur, which may enhance realism for users.

FIG. 1 is a block diagram illustrating an example device 100 that may implement techniques of this disclosure. As shown in FIG. 1, device 100 may comprise any of a wide range of devices, including a desktop computer, a notebook (i.e., laptop) computer, a tablet computer, a set-top box, a telephone handset such as a so-called "smart" phone, a tablet computer, a television, a display device, a digital media player, a video gaming console, a video streaming device, a virtual reality headset, an augmented reality headset, a server computer, a content delivery network device, or the like. In some cases, device 100 is equipped for wireless communication. Thus, device 100 may be a wireless communication device. The techniques described in this disclosure may be applied to wireless and/or wired applications.

In the example of FIG. 1, device 100 includes a video source 102, storage media 104, a rate conversion unit 106, and a display device 108. In other examples, device 100 includes other components or arrangements. For example, device 100 may interface with an external display device, rather than including an integrated display device.

Video source 102 generates a series of frames. Each of the frames is a two-dimensional array of pixels. A frame may also be referred to as a "picture." Video source 102 may generate the series of frames in various ways. For example, video source 102 may receive a bitstream comprising encoded representations of the series of frames. In this example, the series of frames may be encoded using various video coding standards, such as H.265/High Efficiency Video Coding (HEVC), H.264/Advanced Video Coding (AVC), or another video coding standard. In this example, video source 102 may generate the series of frames by decoding the encoded representations of the frames. In another example, video source 102 dynamically generates the frames based on instructions from an application, such as a game. In another example, video source 102 may comprise a camera sensor that captures and stores low-resolution frames interspersed with alternating high-resolution frames and because of limited bandwidth.

Storage media 104 may store the frames generated by video source 102. Storage media 104 may include any of a variety of distributed or locally accessed data storage media such as hard drives, Random Access Memory (RAM) units, optical storage discs, flash memory, volatile or non-volatile memory, or any other suitable digital storage media for storing data.

Video source 102 and rate conversion unit 106 each may be implemented as any of a variety of suitable processing circuits, such as one or more microprocessors, digital signal processors (DSPs), application specific integrated circuits (ASICs), field programmable gate arrays (FPGAs), discrete logic, software, hardware, firmware or any combinations thereof. For instance, video source 102 and rate conversion unit 106 may include integrated circuitry and may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, video source 102 and rate conversion unit 106 may be software units executing on the processing circuitry. When the techniques are implemented partially in software, a device may store instructions for the software in a suitable, non-transitory computer-readable medium and may execute the instructions in hardware using one or more processors to perform the techniques of this disclosure. In such examples, the object code for these software units is stored in memory. An operating system may cause video source 102 and/or rate conversion unit 106 to retrieve the object code and execute the object code, which causes video source 102 and/or rate conversion unit 106 to perform operations to implement the example techniques. In some examples, the software units may be firmware that video source 102 and/or rate conversion unit 106 executes at startup. Accordingly, video source 102 and/or rate conversion unit 106 are structural components having hardware that performs the example techniques or has software/firmware executing on the hardware to specialize the hardware to perform the example techniques.

Rate conversion unit 106 may use frames generated by video source 102 and increase a frame rate of high-resolution frames. Display device 108 displays high-resolution frames at the increased frame rate to a user. Display device 108 may comprise any of a variety of display devices such as a cathode ray tube (CRT), a liquid crystal display (LCD), a plasma display, an organic light emitting diode (OLED) display, or another type of display device.

In accordance with a technique of this disclosure, the series of frames generated by video source 102 includes a series of high-resolution frames and a series of low-resolution frames. For example, the high-resolution frames may have 1080p resolution or 4K resolution, while the low-resolution frames may have a 720×480 resolution or another resolution lower than the high-resolution frames. Because the low-resolution frames include fewer pixels than the high-resolution frames, video source 102 may be able to generate a low-resolution frame in less time than a high-resolution frame. For this reason, video source 102 may be able to generate a stream of high- and low-resolution frames at an acceptable frame rate, such as 120 frames per second (fps). However, the low-resolution frames may be unsuitable for viewing by a user because the low-resolution frames may appear blurry in comparison to the high-resolution frames. Moreover, it would be discomforting to the user for the video to flip back and forth from high resolution to low resolution.

Figure 2:
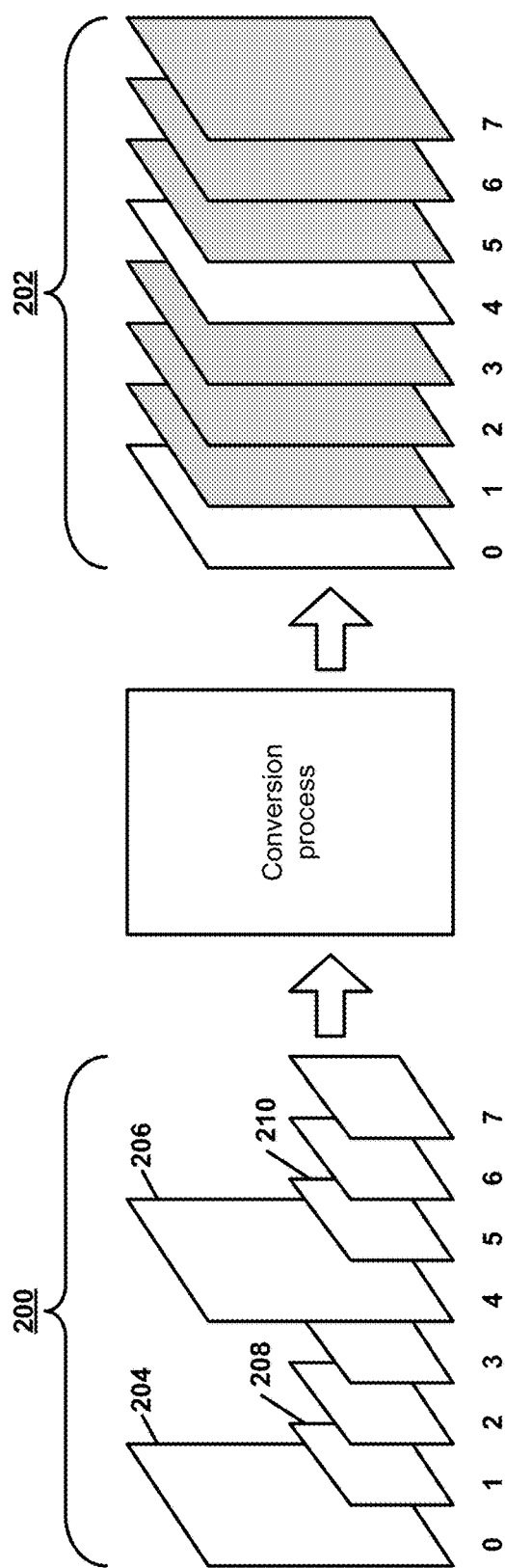
FIG. 2 is a conceptual diagram illustrating an example of using low-resolution frames to increase a frame rate of high-resolution frames in accordance with a technique of this disclosure.

It is therefore desired to increase the rate with which high-resolution frames are presented to the user. To increase the frame rate of high-resolution frames, rate conversion unit 106 generates new high-resolution frames that correspond to output times of the low-resolution frames. For instance, FIG. 2 is a conceptual diagram illustrating an example of using low-resolution frames to increase a frame rate of high-resolution frames in accordance with a technique of this disclosure. As shown in the example of FIG. 2, video source 102 generates a first series of frames 200 that includes high-resolution frames and low-resolution frames. In FIG. 2, high-resolution frames are shown as large quadrilaterals and low-resolution frames are shown as small quadrilaterals. Furthermore, in FIG. 2, frames in the first series of frames 200 are shown in an order in which the content of the frames is output for display. Example output times of the pictures are shown beneath each of the corresponding quadrilaterals.

A conversion process produces a second series of frames 202. The second series of frames 202 includes the same number of frames as the first series of frames 200. However, each frame in the second series of frames 202 is a high-resolution frame. New high-resolution frames in the second series of frames 202 (shown as shaded in FIG. 2) are located in the second series of frames 202 at the positions of the low-resolution frames in the first series of frames 200. In other words, the new high-resolution frames correspond to the output times of the low-resolution frames of the first series of frames 200.

To generate a new high-resolution frame, rate conversion unit 106 may generate a preliminary high-resolution frame based on two or more of the high-resolution frames generated by video source 102. In some examples, the preliminary high-resolution frame has the same resolution as the high-resolution frames generated by video source 102. Furthermore, the preliminary high-resolution frame may correspond to the same output time as one of the low-resolution frames generated by video source 102. For instance, in the example of FIG. 2, rate conversion unit 106 may generate a preliminary high-resolution frame that corresponds to an output time of low-resolution frame 208.

Rate conversion unit 106 may generate the preliminary high-resolution frame in various ways. For example, rate conversion unit 106 may interpolate the preliminary high-resolution frame from a first high-resolution frame corresponding to an output time before an output time of the preliminary high-resolution frame and a second high-resolution frame corresponding to an output time after the output time of the preliminary high-resolution frame. For example, rate conversion unit 106 may interpolate a preliminary high-resolution frame corresponding to low-resolution frame 208 based on high-resolution frames 204 and 206. In another example, rate conversion unit 106 may extrapolate the preliminary high-resolution frame from a first high-resolution frame and a second high-resolution frame, both of which correspond to output times before an output time of the preliminary high-resolution frame. For example, rate conversion unit 106 may extrapolate a preliminary high-resolution frame corresponding to low-resolution frame 210 based on high-resolution frames 204 and 206.

Additionally, rate conversion unit 106 generates a down-sampled frame by down-sampling the preliminary high-resolution frame. Down-sampling the preliminary high-resolution frame reduces the sampling rate in the preliminary high-resolution frame. The down-sampled frame has the same resolution as the low-resolution frames generated by video source 102.

After generating the down-sampled frame, rate conversion unit 106 determines, based on comparisons of blocks of the low-resolution frame and blocks of the down-sampled frame, a plurality of weights. For example, rate conversion unit 106 may partition the down-sampled frame into a plurality of blocks (i.e., "patches"). In some examples, each of the blocks is equally sized. For example, each of the blocks may be 5 samples by 5 samples (i.e., 5×5), 9×9, 15×15, etc. In this example, for each block in the plurality of blocks, rate conversion unit 106 may determine a difference metric that indicates a degree of similarity between the block and a corresponding block in a corresponding low-resolution frame. The corresponding low-resolution frame is one of the low-resolution frames generated by video source 102 and has the same output time as the down-sampled frame.

Rate conversion unit 106 may determine the difference metric in various ways. For example, rate conversion unit 106 may determine the difference metric as a sum of absolute differences between the block in the down-sampled image and the corresponding block in the corresponding low-resolution frame. Thus, in this example, for each pixel of the block in the down-sampled frame, rate conversion unit 106 may determine a difference between the pixel of the block in the down-sampled frame and a corresponding pixel of the corresponding block, determine absolute values of the differences, and sum the absolute values, thereby determining the sum of absolute values. In another example, rate conversion unit 106 may determine the difference metric by a sum of squared differences or another metric that produces a high value when the patches are not similar.

Rate conversion unit 106 may determine the corresponding block in the corresponding low-resolution frame in various ways. For example, the corresponding block in the corresponding low-resolution frame may be collocated with the block in the down-sampled frame. In other words, the block in the down-sampled frame and the corresponding block in the corresponding low-resolution frame correspond to the same region of an image represented in the down-sampled frame and the low-resolution frame. In another example, rate conversion unit 106 may analyze a plurality of blocks to determine the corresponding block. Analyzing multiple blocks may account for motion differences.

Based on the difference metric, rate conversion unit 106 determines a weight for the block in the down-sampled frame. For example, rate conversion unit 106 may look up the weight in a lookup table that maps values of the difference metric to weights. In some examples, the weight is a value in the range of 0 to 1.

Additionally, rate conversion unit 106 generates an up-sampled frame by up-sampling the corresponding low-resolution frame. The up-sampled frame has the same resolution as the high-resolution frames generated by video source 102. Example up-sampling techniques may include bilinear, bicubic or polyphase interpolation.

Rate conversion unit 106 generates a final high-resolution frame based on a weighted average of the up-sampled frame and the preliminary high-resolution frame. The weighted average is based on the plurality of weights. The final high-resolution frame corresponds to the same output time as the preliminary high-resolution frame and the low-resolution frame. In some examples, to generate the final high-resolution frame, rate conversion unit 106 may determine, for each sample in each of the blocks in the up-sampled frame, based on the weight for the block, a sample in the final high-resolution frame as a weighted average of the sample in the block in the up-sampled frame and a corresponding sample in the preliminary high-resolution frame.

For instance, rate conversion unit 106 may determine the sample in the final high-resolution frame such that the sample in the final high-resolution frame is equal to $(w \cdot s_1 + (1-w) \cdot s_2)$, where w is the weight, $s_1$ is the sample in the preliminary high-resolution frame and $s_2$ is the sample in the up-sampled frame. In many instances, if the difference between a block in the low-resolution frame and the corresponding block in the down-sampled frame is high, there is a disocclusion artifact (i.e., an artifact caused by an object in the foreground moving to reveal more of the background) in the down-sampled frame. Accordingly, in this example, if the difference between a block in the low-resolution frame and the corresponding block in the down-sampled frame is high, the value of w may be relatively low, thereby according more weight to the pixels of the up-sampled frame. Conversely, if there is little difference between the block of the low-resolution frame and the corresponding block of the down-sampled frame, the value of w may be relatively high in order to preserve as much of the detail of the preliminary high-resolution frame as possible.

Figure 3:
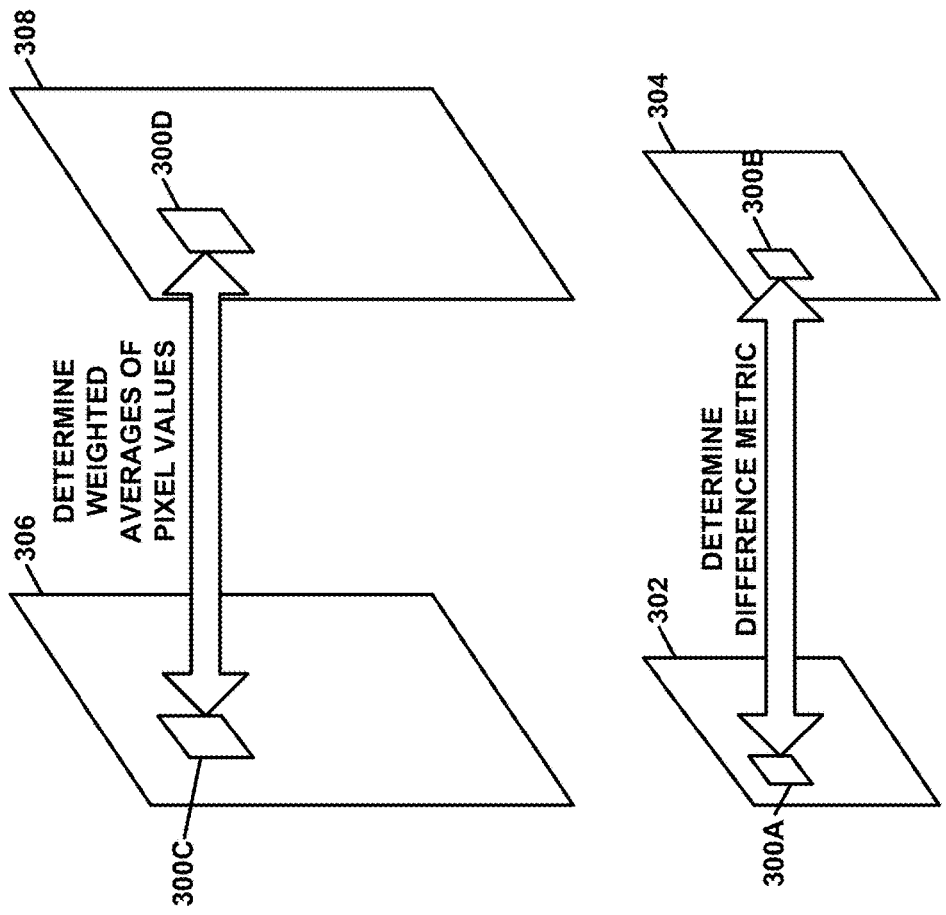
FIG. 3 is a block diagram illustrating example blocks and frames, in accordance with a technique of this disclosure.

In an example illustrated in FIG. 3, a set of corresponding blocks includes a first block 300A, a second block 300B, a third block 300C, and a fourth block 300D (collectively, "blocks 300"). Block 300A is in down-sampled frame 302. Block 300B is in low-resolution frame 304. Block 300C is in up-sampled frame 306. Block 300D is in a first additional high-resolution frame 308 (i.e., a preliminary high-resolution frame). Block 300A, block 300B, block 300C, and block 300D correspond to a same region of an image represented in down-sampled frame 302, low-resolution frame 304, up-sampled frame 306, and first additional high-resolution frame 308. In this example, as part of determine the weights, rate conversion unit 106 determines a difference metric that indicates a degree of difference between block 300A and block 300B. For instance, rate conversion unit 106 may determine a sum of absolute differences between block 300A and block 300B. Additionally, rate conversion unit 106 determines, based on the difference metric, a weight for the set of corresponding blocks 300. The weight for the set of corresponding blocks 300 is one of the weights in the plurality of weights used in generating a second additional high-resolution frame (i.e., a final high-resolution frame) based on a weighted average of up-sampled frame 306 and first additional high-resolution frame 308. Additionally, in this example, as part of generating the second additional high-resolution frame, rate conversion unit 106 may, for each sample in block 300C, determine, based on the weight for the set of corresponding blocks 300, a sample in the second additional high-resolution frame as a weighted average of the sample in block 300C and a corresponding sample in block 300D. For instance, as part of determining the sample in the second additional high-resolution frame, rate conversion unit 106 may determine the sample in the second additional high-resolution frame such that the sample in the second additional high-resolution frame is equal to $(w \cdot s_1 + (1-w) \cdot s_2)$, where w is the weight, $s_1$ is the sample in block 300C, and $s_2$ is the sample in block 300D.

Figure 4:
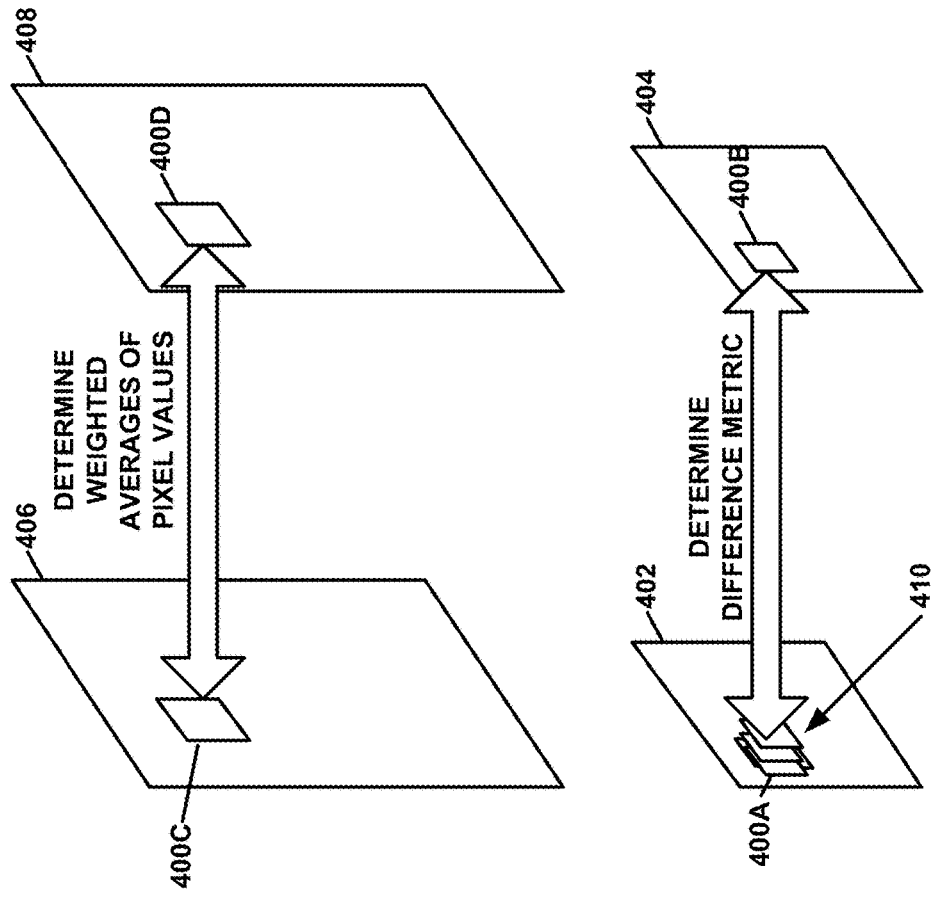
FIG. 4 is a block diagram illustrating example blocks and frames, in accordance with a technique of this disclosure.

FIG. 4 is a block diagram illustrating example blocks and frames, in accordance with a technique of this disclosure. In the example of FIG. 4, a set of corresponding blocks includes a first block 400A, a second block 400B, a third block 400C, and a fourth block 400D. Block 400A is in a first frame 402, block 400B is in a second frame 404, block 400C is in up-sampled frame 406, and block 400D is in a first additional high-resolution frame 408 (i.e., a preliminary high-resolution frame). Frame 402 is either the down-sampled frame or the lower-resolution frame. Frame 404 is the low-resolution frame if frame 402 is the down-sampled frame and frame 404 is the down-sampled frame if frame 402 is the low-resolution frame. In this example, block 400A, block 400B, block 400C, and block 400D correspond to a same region of an image represented in the down-sampled frame, the low-resolution frame, up-sampled frame 406, and first additional high-resolution frame 408. In this example, for each respective block in a plurality of blocks 410 in frame 402, rate conversion unit 106 determines a difference metric for the respective block. The difference metric for the respective block indicates a degree of difference between the respective block and the second block. For instance, the difference metric for the respective block may be a sum of absolute differences between the respective block and block 400B. The plurality of blocks in the first frame includes a block collocated with block 400B and one or more additional blocks of frame 402. In one example, blocks 410 may include a block collocated with block 400B, and blocks one pixel above and below the collocated block, and blocks one pixel left and right of the collocated block. Rate conversion unit 106 selects a particular block from among the plurality of blocks 410 to be block 400A such that the difference metric for the particular block is less than the difference metrics for any other block in the plurality of blocks 410. Additionally, rate conversion unit 106 determines, based on the difference metric, a weight for the set of corresponding blocks 400. The weight for the set of corresponding blocks 400 is one of the weights in the plurality of weights used in determining a weighted average of up-sampled frame 406 and first additional higher-resolution frame 408. In this example, as part of generating a second additional high-resolution frame (e.g., a final high-resolution frame), rate conversion unit 106 may, for each sample in block 400C, determine, based on the weight for the set of corresponding blocks, a sample in the second additional high-resolution frame as a weighted average of the sample in block 400C and a corresponding sample in block 400D.

Figure 5:
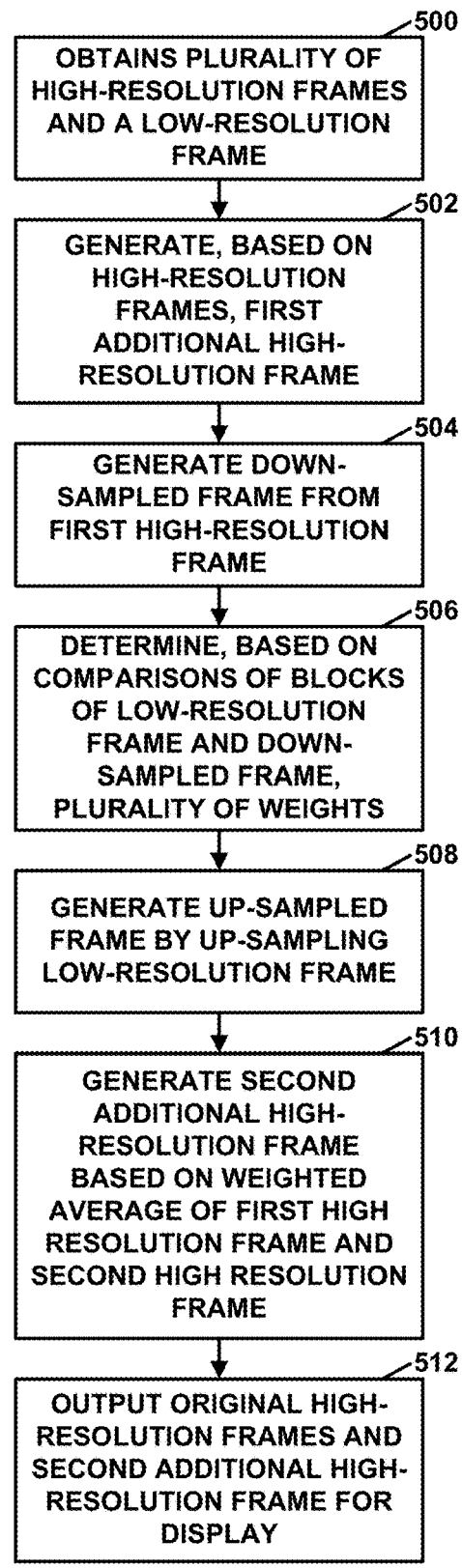
FIG. 5 is a flowchart illustrating an example operation for increasing a frame rate of video data, in accordance with a technique of this disclosure.

FIG. 5 is a flowchart illustrating an example operation for increasing a frame rate of video data, in accordance with a technique of this disclosure. The operations presented in the flowcharts of this disclosure are examples. In other examples, operations may include more, fewer, or different actions, or actions may be performed in different orders or in parallel. Although this disclosure describes the operation of FIG. 5 as being performed by rate conversion unit 105 of device 100, the operation of FIG. 5, and, in general, the techniques of this disclosure, may be performed by one or more devices. The one or more devices may include the types of devices described above with reference to device 100. In instances where the techniques of this disclosure are performed by multiple devices, the devices may be configured to communicate data with each other.

In the example of FIG. 5, rate conversion unit 106 obtains a plurality of original high-resolution frames and a low-resolution frame (500). Rate conversion unit 106 may obtain the plurality of original high-resolution frames and the low-resolution frame from video source 102 (FIG. 1). As discussed above, video source 102 may comprise a video decoder, a graphics engine, or another source of video frames. Each of the plurality of original high-resolution frames has a first resolution and the low-resolution frame has a second resolution lower than the first resolution. In some examples, storage media 104 (FIG. 1) stores the plurality of original high-resolution frames and the low-resolution frame.

Additionally, in the example of FIG. 5, rate conversion unit 106 generates, based on the plurality of original high-resolution frames, a first additional high-resolution frame (502). The first additional high-resolution frame has the first resolution. The first additional high-resolution frame and the low-resolution frame correspond to a same particular output time. Rate conversion unit 106 may generate the first additional high-resolution frame in various ways.

Figure 6:
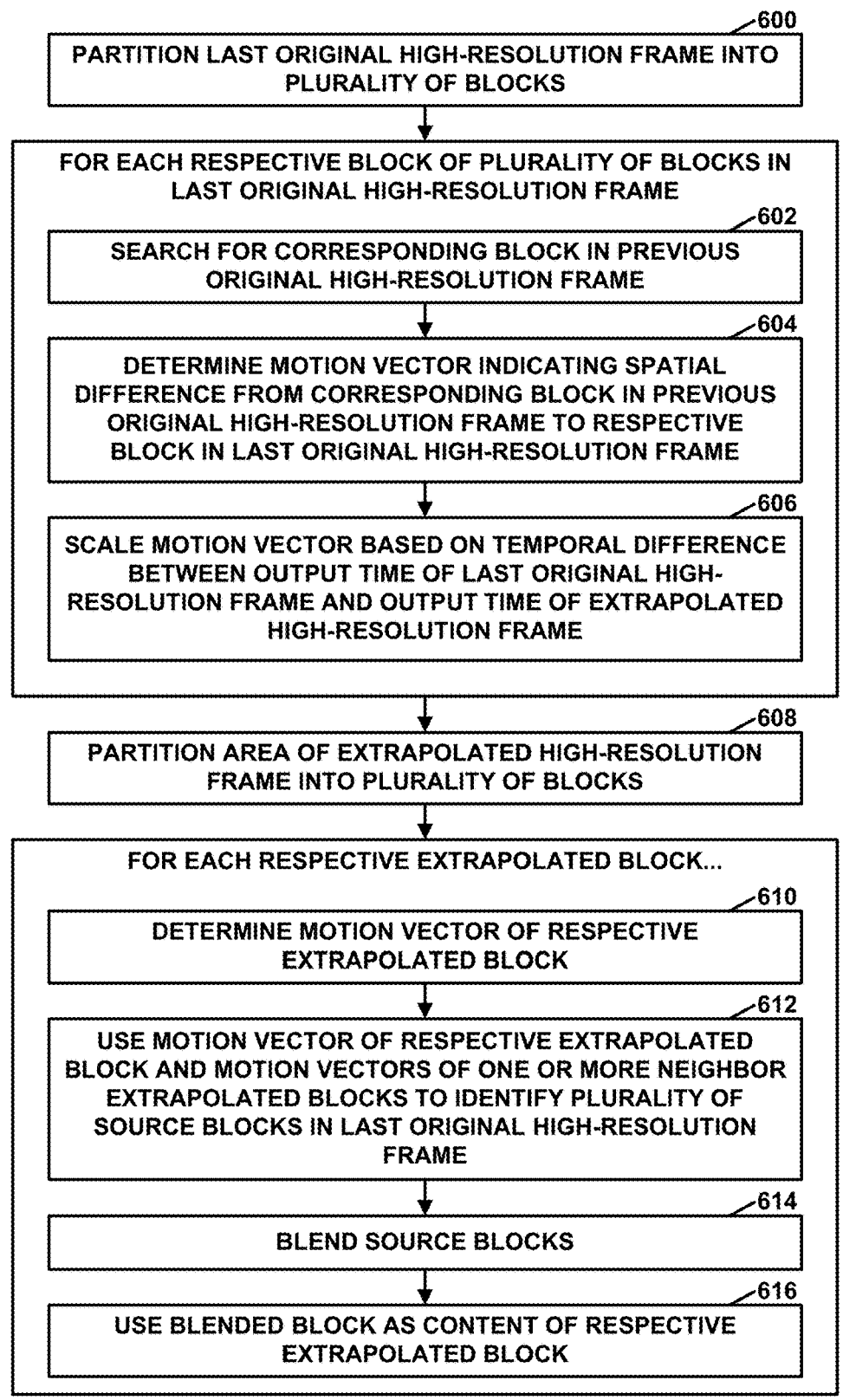
FIG. 6 is a flowchart illustrating an example operation for extrapolating a frame, in accordance with one or more techniques of this disclosure.
Figure 7:
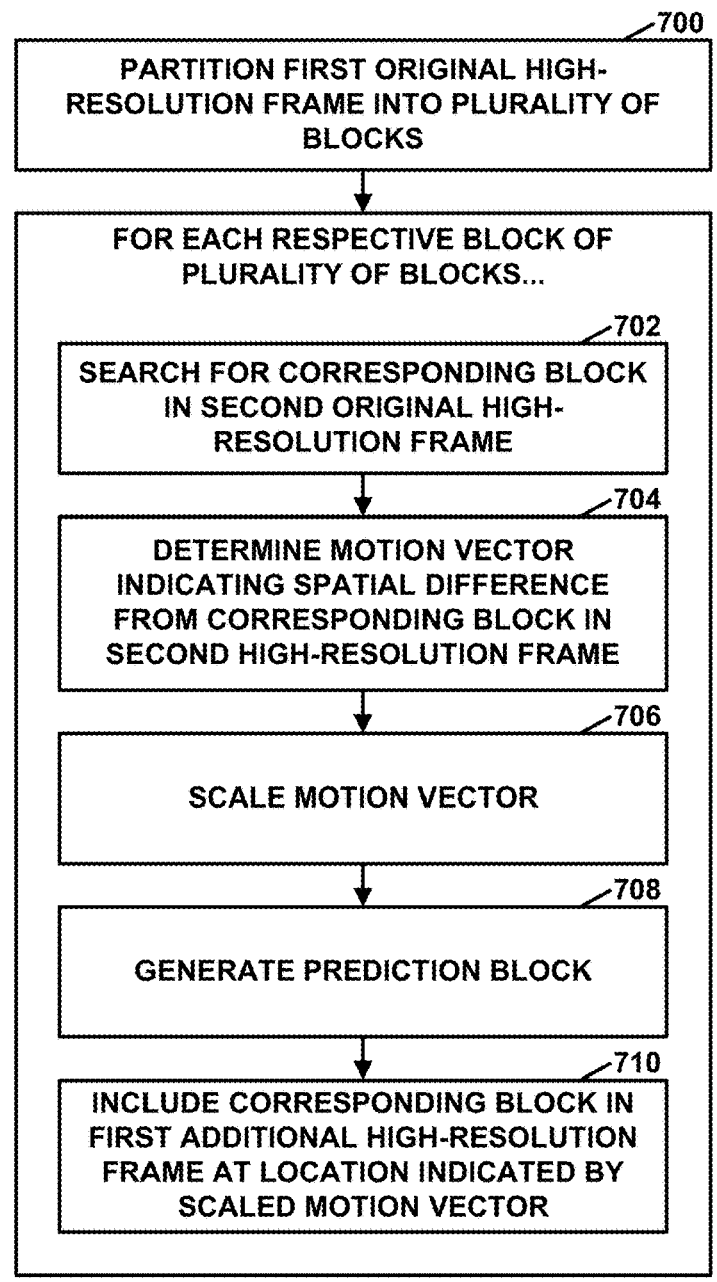
FIG. 7 is a flowchart illustrating an example operation for interpolating a frame, in accordance with one or more techniques of this disclosure.

For example, rate conversion unit 106 extrapolates the first additional high-resolution frame from the plurality of original high-resolution frames. FIG. 6, described below, illustrates an example operation for extrapolating the first additional high-resolution frame. In other examples, rate conversion unit 106 interpolates the first additional high-resolution frame from the plurality of original high-resolution frames. FIG. 7, described below, illustrates an example operation for interpolating the first additional high-resolution frame.

Furthermore, rate conversion unit 106 generates a down-sampled frame by down-sampling the first additional high-resolution frame (504). The down-sampled frame has the second resolution.

Rate conversion unit 106 determines, based on comparisons of blocks of the low-resolution frame and blocks of the down-sampled frame, a plurality of weights (506). In some examples, the blocks of the low-resolution frame and the down-sampled frame are each 2×2 or larger. Furthermore, rate conversion unit 106 generates an up-sampled frame by up-sampling the low-resolution frame (508). The up-sampled frame has the first resolution.

In addition, rate conversion unit 106 generates a second additional higher-resolution frame based on a weighted average of the up-sampled frame and the first additional higher-resolution frame (510). The weighted average is based on the plurality of weights. The second additional higher-resolution frame corresponds to the particular output time.

In the example of FIG. 5, device 100 (FIG. 1) may output the plurality of original high-resolution frames and the second additional high-resolution frame for display (512). For example, display device 108 may display the original high-resolution frames and the second additional high-resolution frame.

FIG. 6 is a flowchart illustrating an example operation for extrapolating a frame, in accordance with one or more techniques of this disclosure. In the example of FIG. 6, rate conversion unit 106 partitions a last original high-resolution frame of the plurality of original high-resolution frames into a plurality of blocks (600). Additionally, rate conversion unit 106 performs actions (602) through (606) for each respective block in the plurality of blocks of the last original high-resolution frame.

Particularly, in the example of FIG. 6, rate conversion unit 106 searches for a corresponding block in a previous original high-resolution frame of the plurality of original high-resolution frames (602). The previous original high-resolution frame has an output time before the last original high-resolution frame. The corresponding block may be a block that best matches the respective block in the first high-resolution frame. For example, rate conversion unit 106 may perform the search starting from a block in the second original high-resolution frame collocated with a current block of the first original high-resolution frame and determine a cost value. The cost value may be a weighted summation of the matching error and motion smoothness metrics. The matching error may be a metric such as a sum of absolute difference, a sum of absolute gradient differences, or a combination of the two. A smoothness metric should be high when motion vectors of neighboring pixels are different and low if they are similar. Many different metrics exists. For example, a difference of the motion vector candidate with the top motion vector, left-motion vector and low-resolution motion vector. Rate conversion unit 106 may run motion estimation at multiple resolutions to get initial estimates. At the final resolution, rate conversion unit 106 uses the low-resolution motion vectors to enforce smoothness. Rate conversion unit 106 may also apply median filtering and post-processing to further smooth the motion vector field.

Additionally, rate conversion unit 106 determines a motion vector indicating a spatial difference from the corresponding block in the previous original high-resolution frame to the respective block in the last original high-resolution frame (604). Rate conversion unit 106 may determine the motion vector by determining differences between the top-left corners of the blocks in the first original high-resolution frame and the second original high-resolution frame.

Furthermore, rate conversion unit 106 scales the motion vector based on a temporal difference between an output time of the last original high-resolution frame and the output time of the extrapolated high-resolution frame (606). For example, assuming the difference between the output time of the last original high-resolution frame and the output time of the previous high-resolution frame is X and the difference between the output time of the last original high-resolution frame and the extrapolated high-resolution frame is Y (assuming that the previous original high-resolution frame has an earlier output time than the last original high-resolution frame), rate conversion unit 106 may scale the motion vector by multiplying each of the vertical and horizontal components of the motion vector by Y/X.

Additionally, in the example of FIG. 6, rate conversion unit 106 partitions the area of the extrapolated frame into a plurality of equally-sized blocks (608). For ease of explanation, this disclosure refers to the blocks in the extrapolated frame as extrapolated blocks. Rate conversion unit 106 performs actions (610) through (616) for each respective extrapolated block of the extrapolated frame. Particularly, for each respective extrapolated block, rate conversion unit 106 may determine a motion vector for the respective extrapolated block (610). For example, rate conversion unit 106 may determine whether any of the scaled motion vectors of blocks in the last high-resolution frame indicate locations within the respective extrapolated block. If one of the scaled motion vectors indicates a location within the respective extrapolated block, rate conversion unit 106 may determine that the scaled motion vector is the motion vector of the respective extrapolated block. If none of the scaled motion vectors indicates a location within the respective extrapolated block, rate conversion unit 106 may generate a motion vector for the respective extrapolated block based on motion vectors of one or more neighboring extrapolated blocks. If two or more of the scaled motion vectors indicated locations within the respective extrapolated block, rate conversion unit 106 may select one of the scaled motion vectors that indicates a location within the respective extrapolated block. For instance, rate conversion unit 106 may select the scaled motion vector corresponding to a foreground object.

Furthermore, in the example of FIG. 6, rate conversion unit 106 may use the motion vector of the respective extrapolated block and the motion vectors of one or more neighbor extrapolated blocks to identify a plurality of source blocks in the last original high-resolution frame (612). The neighbor extrapolated blocks are blocks of the extrapolated frame that neighbor the respective extrapolated block. For example, rate conversion unit 106 may use a motion vector of the respective extrapolated block and motion vectors of up to eight neighbor extrapolated blocks above, below, left, right, and at the corners of the respective extrapolated blocks to identify nine source blocks in the last original high-resolution frame. In another example, rate conversion unit 106 may use the motion vector of the respective extrapolated block and motion vectors of four neighbor extrapolated blocks at the corners of the respective extrapolated block to identify five source blocks in the last original high-resolution frame.

Rate conversion unit 106 may then blend the identified source blocks to generate a blended block (614). Rate conversion unit 106 may blend the identifier source blocks in various ways. For example, for each respective pixel of the respective extrapolated block, rate conversion unit 106 may calculate a value of the respective pixel as a weighted average of corresponding samples in the plurality of source blocks. In this example, a weight applied to a pixel of a source block used in calculating the weighted average for the pixel of the extrapolated block may be dependent on a distance of the pixel of the extrapolated block from a neighbor block whose motion vector was used to identify the source block. For example, if the pixel of the extrapolated block is close to a top edge of the extrapolated block, a pixel in a source block corresponding to a neighbor above the extrapolated block has greater weight than a pixel in a source block corresponding to a neighbor below the extrapolated block. Rate conversion unit 106 may use the blended block as the content of the extrapolated block of the extrapolated frame (616).

In other examples, rate conversion unit 106 may perform extrapolation in other ways. For example, rather than partitioning the extrapolated frame into equally-sized blocks as shown in the example of FIG. 6, rate conversion unit 106 may, for each respective block of the last high-resolution frame (i.e., source block), use the scaled motion vector of the respective block to identify a location into which to copy the respective source block in the extrapolated frame. In this example, if there are areas of the extrapolated frame not covered by any source block copied into the extrapolated frame, rate conversion unit 106 may expand one or more of the source blocks to cover the previously not covered area of the extrapolated frame.

In another example, for each respective pixel of each respective extrapolated block of the extrapolated frame, rate conversion unit 106 may determine, based on motion vectors of four extrapolated blocks that neighbor the current respective extrapolated block, a motion vector for the respective pixel. Rate conversion unit 106 may use the motion vector for the respective pixel to retrieve a pixel from the last high-resolution frame. In some examples, rate conversion unit 106 uses bicubic or bilinear interpolation to determine a value of a pixel to retrieve from the last high-resolution frame if the motion vector has sub-integer precision.

FIG. 7 is a flowchart illustrating an example operation for interpolating a frame, in accordance with one or more techniques of this disclosure. In the example of FIG. 7, rate conversion unit 106 partitions a first original high-resolution frame of the plurality of original high-resolution frames into a plurality of blocks (700). Additionally, rate conversion unit 106 performs actions (702) through (710) for each respective block in the plurality of blocks of the first original high-resolution frame.

Particularly, in the example of FIG. 7, rate conversion unit 106 searches for a corresponding block in a second original high-resolution frame of the plurality of original high-resolution frames (702). The corresponding block may be a block that best matches the respective block in the first high-resolution frame. Rate conversion unit 106 determines a motion vector indicating a spatial difference from the corresponding block in the second original high-resolution frame to the corresponding block in the first original high-resolution frame (704). Rate conversion unit 106 may perform the search and determine the motion vector in the same way as in examples provided elsewhere in this disclosure. Additionally, rate conversion unit 106 scales the motion vector based on a temporal difference between an output time of the first original high-resolution frame and the output time of the first additional high-resolution frame (706). For example, assuming the difference between output times of the first original high-resolution frame and the second original high-resolution frame is X and the difference between the output times of the first original high-resolution frame and the first additional high-resolution frame is Y, rate conversion unit 106 may scale the motion vector by multiplying each of the horizontal and vertical components of the motion vector by Y/X.

Rate conversion unit 106 generates a prediction block based on a weighted average of the respective block in the first original higher-resolution frame and the corresponding block in the second original higher-resolution frame (708). Weights used in determining the weighted average of the respective block and the corresponding block may be based on a temporal distance of the first additional high-resolution frame from the first original high-resolution frame and the temporal distance of the first additional high-resolution frame and the second original high-resolution frame. For example, assuming the difference between output times of the first original high-resolution frame and the second original high-resolution frame is X and the difference between the output times of the first original high-resolution frame and the first additional high-resolution frame is Y, rate conversion unit 106 may determine a weight $w_p$=Y/X. In this example, for each pixel of the respective block of the first original high-resolution frame, rate conversion unit 106 may determine a pixel in the prediction block as $v_p = v_1 \cdot w_p + v_2 \cdot (1-w_p)$, where $v_1$ is a sample of the respective block of the first original high-resolution frame and $v_2$ is a sample of the block of the second original high-resolution frame identified by the motion vector.

Rate conversion unit 106 includes the prediction block in the first additional high-resolution frame at a location indicated by the scaled motion vector (710). For example, assuming that the coordinates of the respective block of the first original high-resolution frame are (x, y) and the scaled motion vector is $<mv_h, mv_v>$, rate conversion unit 106 may include the prediction block in the first additional high-resolution frame such that the top-left coordinates of the prediction block in the first additional high-resolution frame are $(x+mv_h, y+mv_v)$.

Although the examples of FIGS. 6 and 7 are described with regard to two original high-resolution frames, other examples may include more than two original high-resolution frames. For instance, rate conversion unit 106 may determine the motion vector as an average of scaled motion vectors indicating differences between corresponding blocks in three or more original high-resolution frames.

Figure 8:
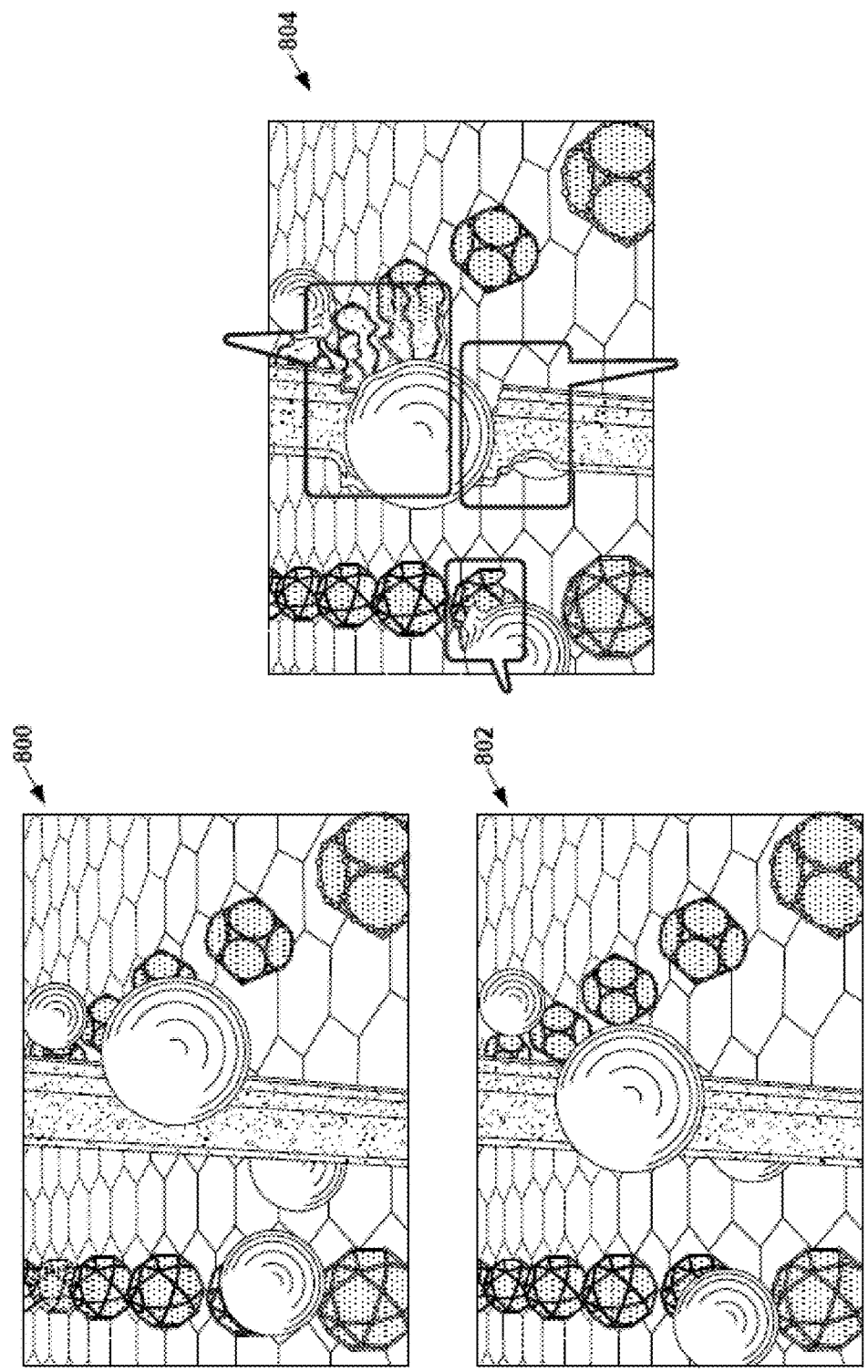
FIG. 8 illustrates artifacts generated in an extrapolated or interpolated frame when revealed background pixels are filled with neighboring pixels.

FIG. 8 illustrates artifacts generated in an extrapolated or interpolated frame when revealed background pixels are filled with neighboring pixels. In the example of FIG. 8, frame 800 corresponds to an output time t and frame 802 corresponds to an output time t+1. Frame 804 is extrapolated from frame 800 or interpolated from frames 800 and 802. Frame 804 corresponds to an output time of t+0.5. In the example of FIG. 8, artifacts in frame 804 caused by filling in revealed background with neighboring samples are outlined in black boxes. The artifacts appear as though parts of the background have been stretched or dragged in the wake of the balls moving from right to left in the foregrounds of pictures 800 and 802.

Figure 9:
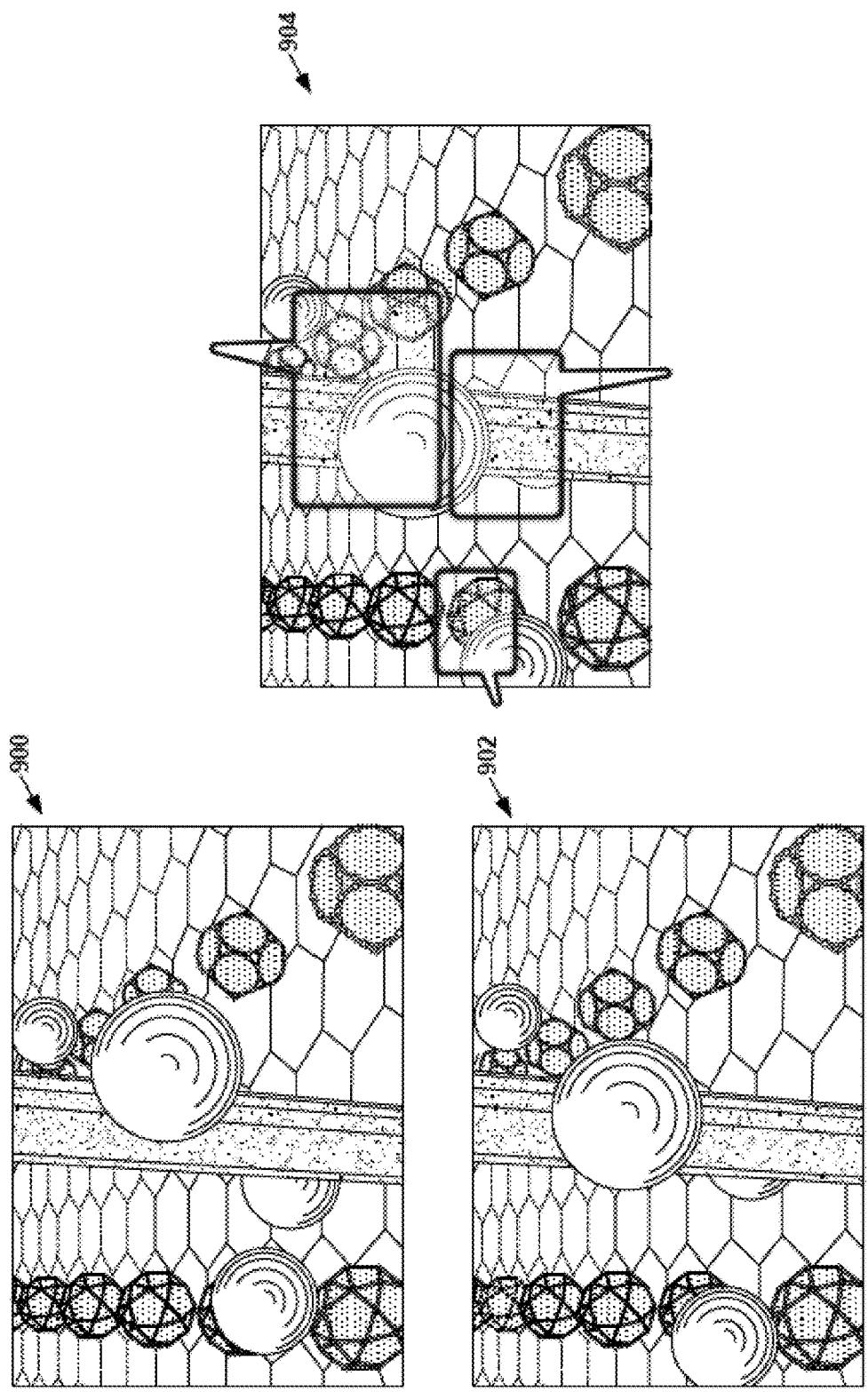
FIG. 9 illustrates an example high-resolution frame generated in accordance with a technique of this disclosure.

FIG. 9 illustrates an example high-resolution frame generated in accordance with a technique of this disclosure. In the example of FIG. 9, frame 900 corresponds to an output time t and frame 902 corresponds to an output time t+1. Frame 900 and frame 902 are the same as frame 800 and 802 in FIG. 8. However, frame 904 is generated in accordance with a technique of this disclosure from frame 900 or frames 900 and 902. Frame 904 corresponds to an output time of t+0.5. As can be seen in the example of FIG. 9, the artifacts shown in FIG. 8 are not present, but the areas on the wake of the balls moving from right to left are somewhat blurry due to use of a low-resolution frame in generating frame 904. In the example of FIG. 9, blurriness is represented using dashed lines within the areas denoted by the black boxes. It should be noted with respect to FIG. 9 that only pixels that are not good matches for the low-resolution pixels are replaced by the low-resolution pixels. Therefore, pixels that are extrapolated correctly remain in high resolution and pixels with noticeable artifacts are replaced by low-resolution pixels and the areas in between may gracefully change from low resolution to high resolution. Thus, the pixels on the balls, the pillar and the background that are correctly extrapolated remain in high resolution. Other artifact areas are based on low-resolution samples.

Figure 10:
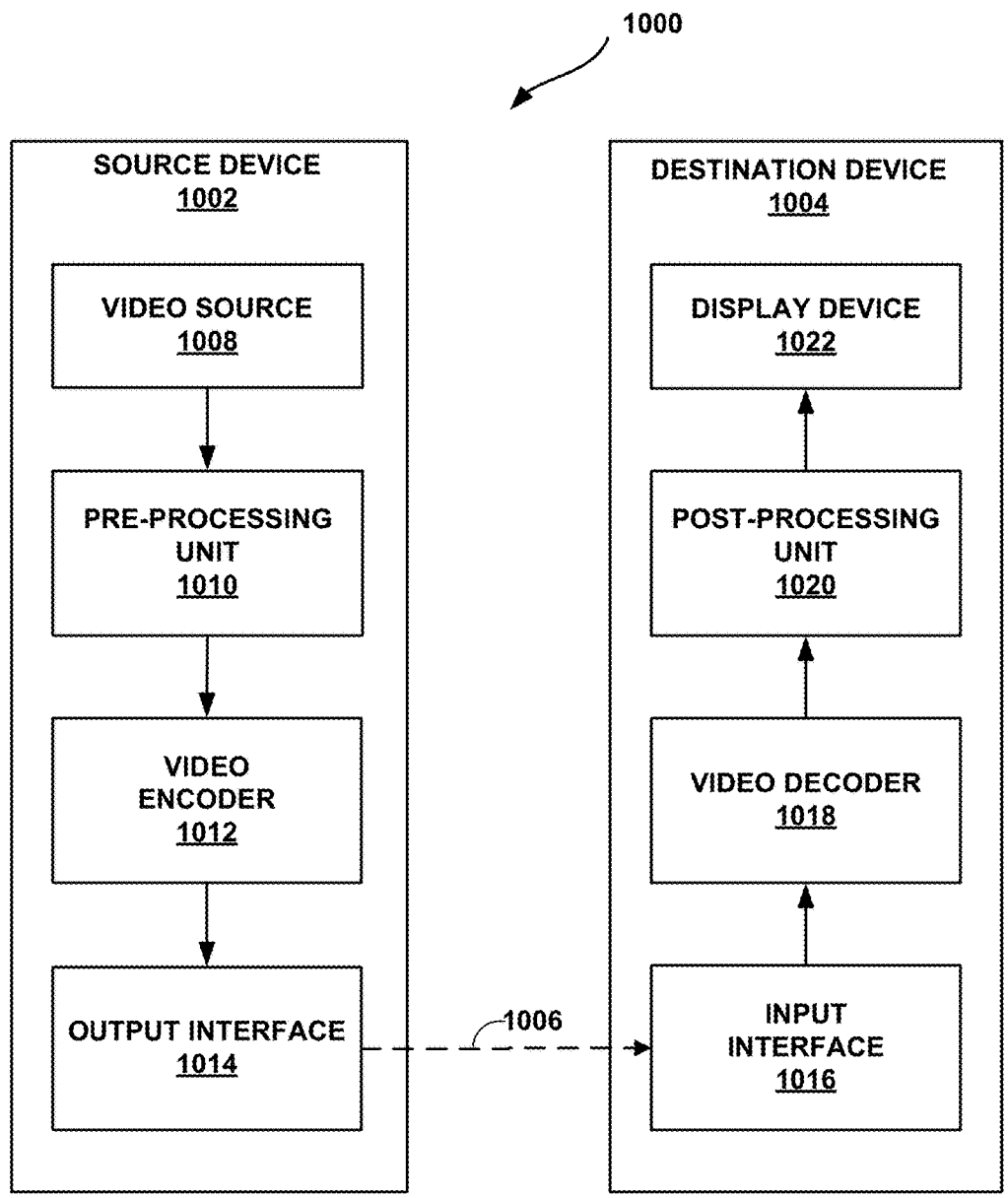
FIG. 10 is a block diagram illustrating an example system for encoding and decoding video data, in accordance with a technique of this disclosure.

FIG. 10 is a block diagram illustrating an example system 1000 for encoding and decoding video data, in accordance with a technique of this disclosure. As shown in FIG. 10, system 1000 includes a source device 1002 that provides encoded video data to be decoded at a later time by a destination device 1004. In particular, source device 1002 provides the encoded video data to destination device 1004 via a computer-readable medium 1006.

Source device 1002 and destination device 1004 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 1002 and destination device 1004 are equipped for wireless communication. Thus, source device 1002 and destination device 1004 may be wireless communication devices. The techniques described in this disclosure may be applied to wireless and/or wired applications. Source device 1002 is an example video encoding device (i.e., a device for encoding video data). Destination device 1004 is an example video decoding device (i.e., a device for decoding video data).

In the example of FIG. 10, source device 1002 includes a video source 1008, a pre-processing unit 1010, a video encoder 1012, and an output interface 1014. Destination device 1004 includes an input interface 1016, a video decoder 1018, a post-processing unit 1020, and display device 1022. In other examples, source device 1002 and destination device 1004 include other components or arrangements. For example, source device 1002 may receive video data from an external video source, such as an external camera. Likewise, destination device 1004 may interface with an external display device, rather than including an integrated display device.

Video source 1008 is a source of video data. The video data may comprise a series of pictures. Video source 1008 may include a video capture device, such as a video camera, a video archive containing previously captured video, and/or a video feed interface to receive video data from a video content provider. In some examples, video source 1008 generates computer graphics-based video data, or a combination of live video, archived video, and computer-generated video. As described below, pre-processing unit 1010 may perform a process to reduce the amount of data in target frames of the video data. Video encoder 1012 may then encode the frames according to a video codec.

Output interface 1014 may output the encoded video information to computer-readable medium 1006. Output interface 1014 may comprise various types of components or devices. For example, output interface 1014 may comprise a wireless transmitter, a modem, a wired networking component (e.g., an Ethernet card), or another physical component. In examples where output interface 1014 comprises a wireless transmitter, output interface 1014 may be configured to transmit data, such as encoded video data, modulated according to a cellular communication standard, such as 4G, 4G-LTE, LTE Advanced, 5G, and the like. In some examples where output interface 1014 comprises a wireless transmitter, output interface 1014 may be configured to transmit data, such as encoded video data, modulated according to other wireless standards, such as an IEEE 802.11 specification, an IEEE 802.15 specification (e.g., ZigBee™), a Bluetooth™ standard, and the like. In some examples, circuitry of output interface 1014 is integrated into circuitry of pre-processing unit 1010, video encoder 1012, and/or other components of source device 1002. For example, pre-processing unit 1010, video encoder 1012, and output interface 1014 may be parts of a system on a chip (SoC). The SoC may also include other components, such as a general-purpose microprocessor, a graphics processing unit, and so on.

Destination device 1004 may receive encoded video data to be decoded via computer-readable medium 1006. Computer-readable medium 1006 may comprise any type of medium or device capable of moving the encoded video data from source device 1002 to destination device 1004. In some examples, computer-readable medium 1006 comprises a communication medium to enable source device 1002 to transmit encoded video data directly to destination device 1004 in real-time. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 1002 to destination device 1004. Destination device 1004 may comprise one or more data storage media configured to store encoded video data and decoded video data.

In some examples, output interface 1014 may output data, such as encoded video data, to an intermediate device, such as a storage device. Similarly, input interface 1016 of destination device 1004 may receive encoded data from the intermediate device. The intermediate device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In some examples, the intermediate device corresponds to a file server. Example file servers include web servers, FTP servers, network attached storage (NAS) devices, or local disk drives.

Destination device 1004 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

Computer-readable medium 1006 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 1002 and provide the encoded video data to destination device 1004, e.g., via network transmission. Similarly, a computing device of a medium production facility, such as a disc stamping facility, may receive encoded video data from source device 1002 and produce a disc containing the encoded video data. Therefore, computer-readable medium 1006 may be understood to include one or more computer-readable media of various forms, in various examples.

Input interface 1016 of destination device 1004 receives data from computer-readable medium 1006. Input interface 1016 may comprise various types of components or devices. For example, input interface 1016 may comprise a wireless receiver, a modem, a wired networking component (e.g., an Ethernet card), or another physical component. In examples where input interface 1016 comprises a wireless receiver, input interface 1016 may be configured to receive data, such as the bitstream, modulated according to a cellular communication standard, such as 4G, 4G-LTE, LTE Advanced, 5G, and the like. In some examples where input interface 1016 comprises a wireless receiver, input interface 1016 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 1016 may be integrated into circuitry of post-processing unit 1020, video decoder 1018, and/or other components of destination device 1004. For example, post-processing unit 1020, video decoder 1018, and input interface 1016 may be parts of a SoC. The SoC may also include other components, such as a general-purpose microprocessor, a graphics processing unit, and so on.

Video decoder 1018 may decode the encoded video data received by input interface 1016. As described below, post-processing unit 1020 may perform an operation that restores details of target frames in accordance with a technique of this disclosure. Display device 1022 displays the decoded video data, including restored target frames, to a user. Display device 1022 may comprise any of a variety of display devices such as a cathode ray tube (CRT), a liquid crystal display (LCD), a plasma display, an organic light emitting diode (OLED) display, or another type of display device.

Pre-processing unit 1010, video encoder 1012, video decoder 1018, and post-processing unit 1020 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 1012 and video decoder 1018 may be included in one or more encoders or decoders, either of which may be integrated as part of a combined encoder/decoder (CODEC) in a respective device.

In some examples, video encoder 1012 and video decoder 1018 encode and decode video data according to a video coding standard or specification. For example, video encoder 1012 and video decoder 1018 may encode and decode video data according to ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, or another video coding standard or specification. In some examples, video encoder 1012 and video decoder 1018 encode and decode video data according to the, High Efficiency Video Coding (HEVC), which as known as or ITU-T H.265, its range and screen content coding extensions, its 3D video coding extension (3D-HEVC), its multiview extension (MV-HEVC), or its scalable extension (SHVC).

In accordance with a technique of this disclosure, the video data may include a series of frames that includes "source frames" and "target frames." The source frames may occur on a periodic basis (e.g., every fifth frame), and the target frames may be the remaining frames. As mentioned above, pre-processing unit 1010 may perform an operation of reduce detail of target frames. Post-processing unit 1020 may at least partially restore details of the target frames.

Thus, in the example of FIG. 10, pre-processing unit 1010 may obtain a plurality of source frames and may obtain a target frame. Additionally, pre-processing unit 1010 may generate a synthetic frame based on the source frames. The synthetic frame and the target frame correspond to a same particular output time. Pre-processing unit 1010 may generate the synthetic frame based on the source frames in accordance with the examples for extrapolation and interpolation described elsewhere in this disclosure.

Furthermore, for each block of the target frame, pre-processing unit 1010 may determine, based on a comparison of the block of the target frame and a corresponding block of the synthetic frame, a weight for the block of the target frame. Pre-processing unit 1010 may determine the weight for the block in accordance with the examples provided elsewhere in this disclosure.

Furthermore, pre-processing unit 1010 may determine, based on the weight for the block of the target frame relative to a predetermined threshold, whether to change pixels of the block of the target frame to a fixed value, such as 0. For example, if the weight for the block of the target frame is equal to 0, then the corresponding block of the synthetic frame very closely, if not exactly, matches the block of the target frame. Hence, there may be no need to send the original pixel values for the block of the target frame, even in a low-resolution mode. Rather, by setting all pixel values in the target frame block to the same value (e.g., 0), video encoder 1012 may be able to encode the target frame block very efficiently. For each pixel of the target frame block, post-processing unit 1020 may multiply the decoded value of the pixel (e.g., 0) by the weight for the target frame block (e.g., 0) and add the corresponding pixel value of a block of the synthetic frame multiplied by 1 minus the weight (e.g., 1−0=1), thereby directly using the pixel value of the block of the synthetic frame. Output interface 1014 of source device 1002 may output data comprising a representation of the block of the target frame (e.g., encoded video data generated by video encoder 1012 for the block of the target frame) and the weight for the block of the target frame.

Post-processing unit 1020 may obtain decoded frames, including source frames and a target frame, from video decoder 1018. Additionally, post-processing unit 1020 may obtain a weight value for each block of the target frame (i.e., target frame blocks). In this example, post-processing unit 1020 may generate a first synthetic frame based on the plurality of source frames. Post-processing unit 1020 may use the interpolation or extrapolation techniques described elsewhere in this disclosure to generate the first synthetic frame.

Furthermore, for each of the target frame blocks, post-processing unit 1020 may generate, in a second synthetic frame, a synthetic block corresponding to the target frame block. The first synthetic frame, the second synthetic frame, and the target frame correspond to a same particular output time. As part of generating the synthetic block corresponding to the target frame block, post-processing unit 1020 may, for each pixel of the target frame block, calculate a value of a pixel of the synthetic block corresponding to the target frame block as being equal to $w \cdot s_1 + (1-w) \cdot s_2$, where w is the weight for the target frame block, $s_1$ is a value of the pixel of the target frame and $s_2$ is a value of a pixel of the first synthetic frame corresponding to the pixel of the target frame block. In this way, if pre-processing unit 1010 sets the weight for the target frame block to 0 because the target frame block is sufficiently similar to the corresponding block in the first synthetic frame, the calculated pixel values are equal to the pixel values in the first synthetic frame. This may reduce the amount of data signaled for the target frame. However, if the weight is non-zero, the pixel values of the target frame may serve to correct errors in the first synthetic frame, similar to how pixel values in the low-resolution frame serve to correct errors in the extrapolated or interpolated frames described elsewhere in this disclosure.

Figure 11:
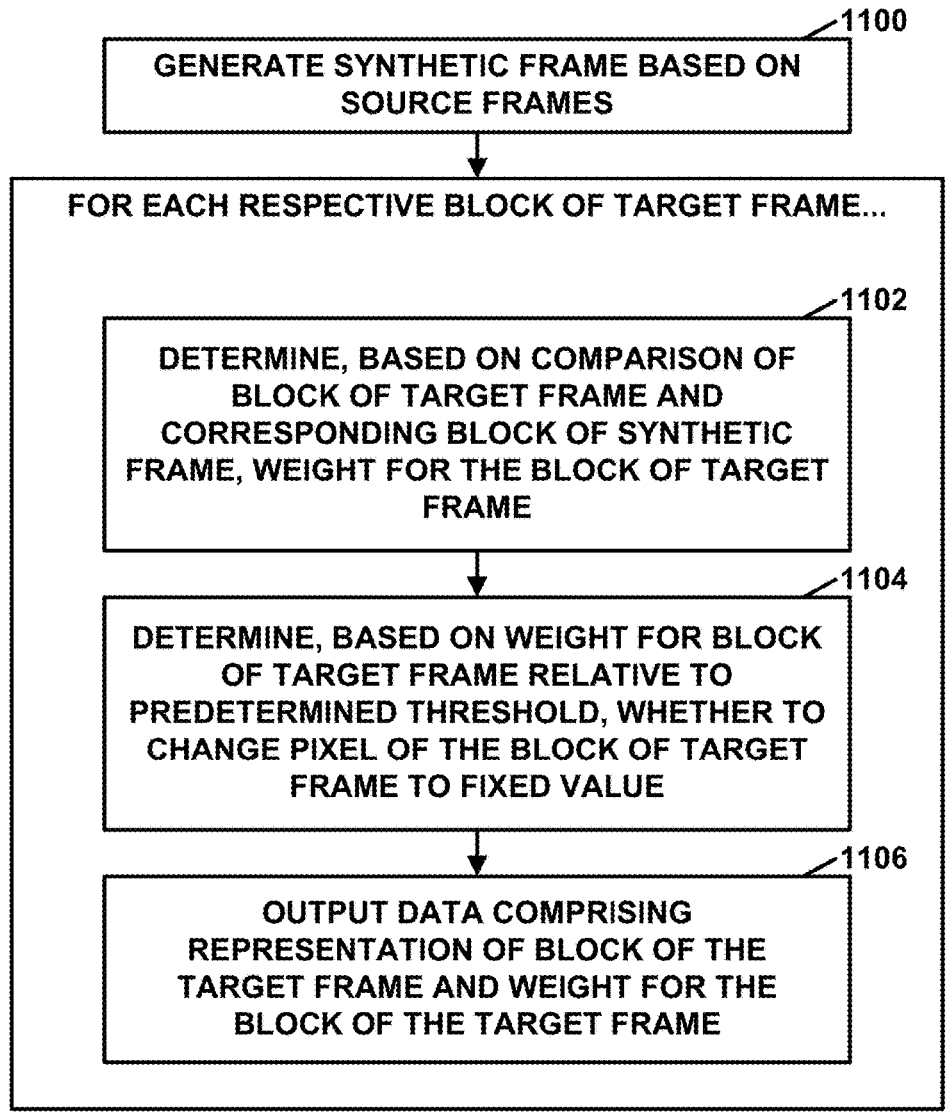
FIG. 11 is a flowchart illustrating an example operation for encoding video data in accordance with a technique of this disclosure.

FIG. 11 is a flowchart illustrating an example operation for encoding video data in accordance with a technique of this disclosure. In the example of FIG. 11, source device 1002 may generate a synthetic frame based on a plurality of source frames (1100). For example, source device 1002 may generate the synthetic frame using the extrapolation or interpolation techniques described elsewhere in this disclosure. In the example of FIG. 11, the synthetic frame and the target frame correspond to a same particular output time.

Furthermore, in the example of FIG. 11, source device 1002 may perform actions (1102) through (1106) for each block of the target frame. Particularly, source device 1002 may determine, based on a comparison of the block of the target frame and a corresponding block of the synthetic frame, a weight for the block of the target frame (1108). Source device 1002 may determine the weight for the block in accordance with any of the examples provided elsewhere in this disclosure. For example, source device 1002 may calculate a difference metric indicating a level of difference between the target frame block and the synthetic frame block. In this example, source device 1002 may use the difference metric to look up the weight in a predetermined lookup table.

Furthermore, source device 1002 may determine, based on the weight for the block of the target frame relative to a predetermined threshold, whether to change pixels of the block of the target frame to a fixed value (1104). For example, if the weight for the target frame block is less than 0.01, source device 1002 may change the pixel values of the target frame block to the fixed value, such as 0, 1, or another number. Thus, all pixel values in the target frame block have the same value. Thus, for a particular block of the target frame, in response to making a determining to change the pixels of the particular block of the target frame to the fixed value, source device 1002 changes all of the pixels of the particular block of the target frame to the fixed value.

Source device 1002 may output data comprising a representation of the block of the target frame and the weight for the block of the target frame (1106). For instance, source device 1002 may encode the target frame block using a video coding standard (e.g., H.264/AVC, HEVC, etc.) and include the encoded block, along with the weight for the target frame block, in a format suitable for storage or streaming.

In some examples, source device 1002 down-samples the block of the target frame. In some examples, source device 1002 down-samples the block of the target frame as part of down-sampling the target frame as a whole. In other examples, source device 1002 performs separate down-sampling operations for each of the blocks of the target frame. In such examples, source device 1002 may generate the representation of a block of the target frame based on the down-sampled version of the block of the target frame.

Figure 12:
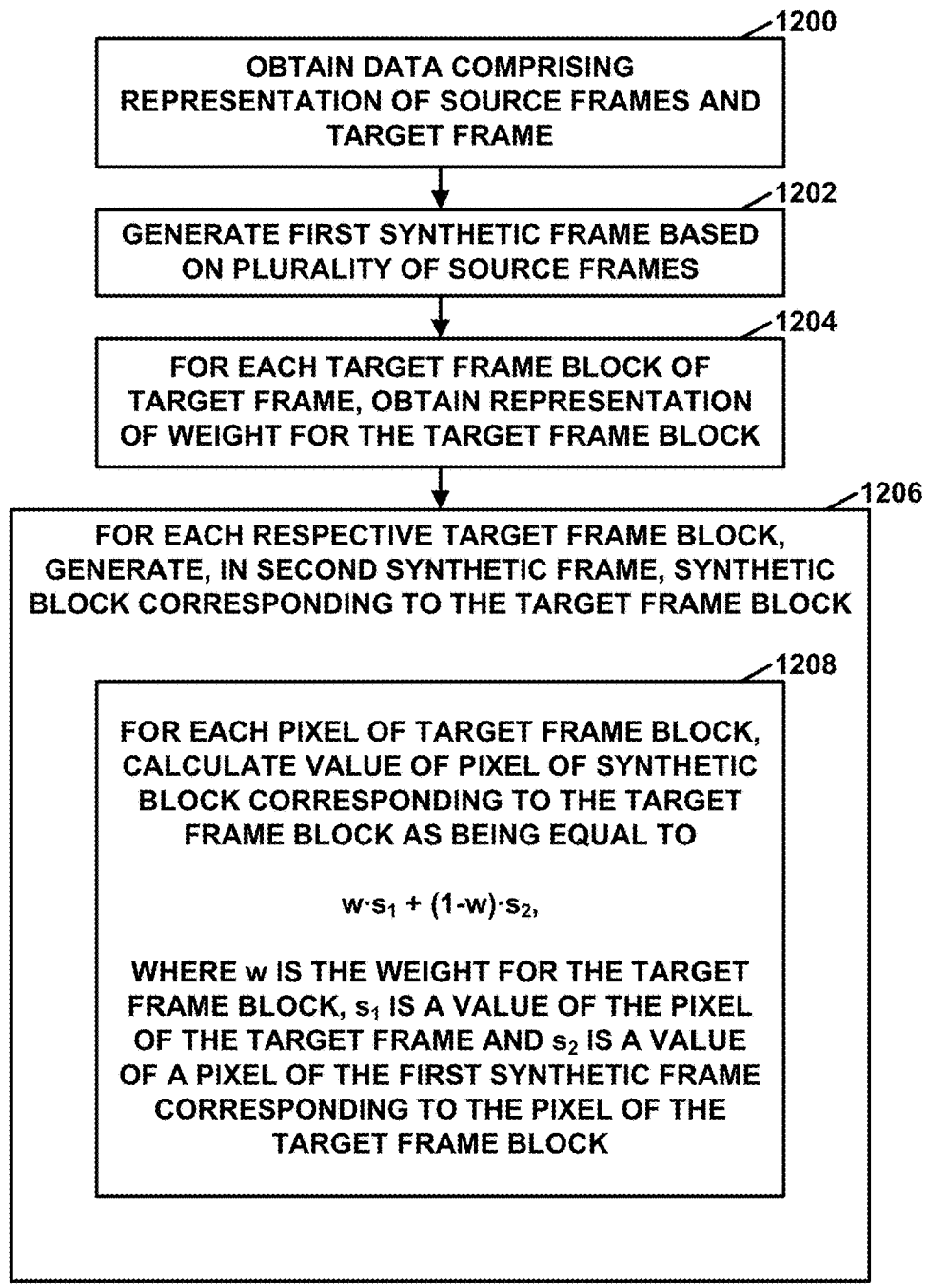
FIG. 12 is a flowchart for reconstructing video data in accordance with a technique of this disclosure.

FIG. 12 is a flowchart for reconstructing video data in accordance with a technique of this disclosure. In the example of FIG. 11, destination device 1004 may obtain data comprising a representation of a plurality of source frames and a target frame (1200). For example, destination device 1004 may receive a bitstream comprising an encoded representation of the source frames and the target frame.

Furthermore, in the example of FIG. 12, destination device 1004 generates a first synthetic frame based on the plurality of source frames (1202). Destination device 1004 may generate the first synthetic frame using the extrapolation or interpolation techniques described elsewhere in this disclosure. Additionally, destination device 1004 may obtain, for each target frame block of the target frame, a representation of a weight for the target frame block (1204).

For each of the target frame blocks, destination device 1004 may generate, in a second synthetic frame, a synthetic block corresponding to the target frame block (1206). The first synthetic frame, the second synthetic frame, and the target frame correspond to a same particular output time. As part of generating the synthetic block corresponding to the target frame block, destination device 1004 may calculate, for each pixel of the target frame block, a value of a pixel of the synthetic block corresponding to the target frame block as being equal to $w \cdot s_1 + (1-w) \cdot s_2$, where w is the weight for the target frame block, $s_1$ is a value of the pixel of the target frame and $s_2$ is a value of a pixel of the first synthetic frame corresponding to the pixel of the target frame block.

Furthermore, in some examples, destination device 1004 may outputting the plurality of source frames and the second synthetic frame for display. In some examples, for each of the target frame blocks, prior to generating the synthetic block corresponding to the target frame block, destination device 1004 may up-sample the target frame block. Destination device 1004 may up-sample the target frame block as part of up-sampling the target frame as a whole. Alternatively, destination device 1004 may up-sample the target frame block as part of destination device 1004 performing separate up-sampling operations on each of the blocks of the target frame.

In this disclosure, ordinal terms such as "first," "second," "third," and so on, are not necessarily indicators of positions within an order, but rather may simply be used to distinguish different instances of the same thing. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of increasing a frame rate of video data performed by one or more devices, the method comprising:
   obtaining a plurality of original higher-resolution frames and a lower-resolution frame, each of the plurality of original higher-resolution frames having a first resolution, the lower-resolution frame having a second resolution lower than the first resolution;
   generating, based on the plurality of original higher-resolution frames, a first additional higher-resolution frame, the first additional higher-resolution frame having the first resolution, the first additional higher-resolution frame and the lower-resolution frame corresponding to a same particular output time;
   generating a down-sampled frame by down-sampling the first additional higher-resolution frame, the down-sampled frame having the second resolution, wherein:
      a set of corresponding blocks includes a first block, a second block, a third block, and a fourth block, the first block being in the down-sampled frame, the second block being in the lower-resolution frame, the third block being in an up-sampled frame, and the fourth block being in the first additional higher-resolution frame, and
      the first block, the second block, the third block, and the fourth block correspond to a same region of an image represented in the down-sampled frame, the lower-resolution frame, the up-sampled frame, and the first additional higher-resolution frame;
   determining, based on comparisons of blocks of the lower-resolution frame and blocks of the down-sampled frame, a plurality of weights, wherein determining the plurality of weights comprises:
      determining a difference metric that indicates a degree of difference between the first block and the second block; and
      determining, based on the difference metric, a weight for the set of corresponding blocks, the weight for the set of corresponding blocks being one of the weights in the plurality of weights;
   generating the up-sampled frame by up-sampling the lower-resolution frame, the up-sampled frame having the first resolution; and
   generating a second additional higher-resolution frame based on a weighted average of the up-sampled frame and the first additional higher-resolution frame, wherein:
      the weighted average is based on the plurality of weights, and wherein the second additional higher-resolution frame corresponds to the particular output time, and
      generating the second additional higher-resolution frame comprises, for each sample in the third block, determining, based on the weight for the set of corresponding blocks, a sample in the second additional higher-resolution frame as a weighted average of the sample in the third block and a corresponding sample in the fourth block.

2. The method of claim 1, further comprising:
   outputting the plurality of original higher-resolution frames and the second additional higher-resolution frame for display.

3. The method of claim 1, wherein determining the sample in the second additional higher-resolution frame comprises determining the sample in the second additional higher-resolution frame such that the sample in the second additional higher-resolution frame is equal to $(w \cdot s_1 + (1-w) \cdot s_2)$, where w is the weight, $s_1$ is the sample in the third block, and $s_2$ is the sample in the fourth block.

4. The method of claim 1, wherein generating the first additional higher-resolution frame comprises:
   extrapolating the first additional higher-resolution frame from the plurality of original higher-resolution frames.

5. The method of claim 4, wherein the particular output time is an output time of the first additional higher-resolution frame, and extrapolating the first additional higher-resolution frame comprises:
   partitioning a first original higher-resolution frame of the plurality of original higher-resolution frames into a plurality of blocks; and
   for each respective block in the plurality of blocks of the first original higher-resolution frame:
      searching for a corresponding block in a second original higher-resolution frame of the plurality of original higher-resolution frames;
      determining a motion vector indicating a spatial difference from the corresponding block in the second original higher-resolution frame to the respective block of the first original higher-resolution frame;
      scaling the motion vector based on a temporal difference between an output time of the first original higher-resolution frame and the output time of the first additional higher-resolution frame; and
      including the corresponding block in the first additional higher-resolution frame at a location indicated by the scaled motion vector.

6. The method of claim 1, wherein generating the first additional higher-resolution frame comprises:
   interpolating the first additional higher-resolution frame from the plurality of original higher-resolution frames.

7. The method of claim 1, wherein interpolating the first additional higher-resolution frame comprises:
   partitioning a first original higher-resolution frame of the plurality of original higher-resolution frames into a plurality of blocks; and
   for each respective block in the plurality of blocks of the first original higher-resolution frame:
      searching for a corresponding block in a second original higher-resolution frame of the plurality of original higher-resolution frames;
      determining a motion vector indicating a spatial difference from the corresponding block in the second original higher-resolution frame to the respective block of the first original higher-resolution frame;
      scaling the motion vector based on a temporal difference between an output time of the first original higher-resolution frame and the output time of the first additional higher-resolution frame; and
      generating a prediction block based on a weighted average of the respective block in the first original higher-resolution frame and the corresponding block in the second original higher-resolution frame; and
      including the prediction block in the first additional higher-resolution frame at a location indicated by the scaled motion vector.

8. The method of claim 1, wherein the blocks of the lower-resolution frame and the blocks of the down-sampled frame are each 2×2 or larger.

9. A device comprising:
   a memory configured to store a plurality of original higher-resolution frames and a lower-resolution frame, each of the plurality of original higher-resolution frames having a first resolution, the lower-resolution frame having a second resolution lower than the first resolution; and one or more processing circuits configured to:

generate, based on the plurality of original higher-resolution frames, a first additional higher-resolution frame, the first additional higher-resolution frame having the first resolution, the first additional higher-resolution frame and the lower-resolution frame corresponding to a same particular output time;

generate a down-sampled frame by down-sampling the first additional higher-resolution frame, the down-sampled frame having the second resolution, wherein:

a set of corresponding blocks includes a first block, a second block, a third block, and a fourth block, the first block being in the down-sampled frame, the second block being in the lower-resolution frame, the third block being in an up-sampled frame, and the fourth block being in the first additional higher-resolution frame, and the first block, the second block, the third block, and the fourth block correspond to a same region of an image represented in the down-sampled frame, the lower-resolution frame, the up-sampled frame, and the first additional higher-resolution frame;

determine, based on comparisons of blocks of the lower-resolution frame and blocks of the down-sampled frame, a plurality of weights, wherein the one or more processing circuits are configured such that, as part of determining the plurality of weights, the one or more processing circuits:

determine a difference metric that indicates a degree of difference between the first block and the second block; and determine, based on the difference metric, a weight for the set of corresponding blocks, the weight for the set of corresponding blocks being one of the weights in the plurality of weights;

generate the up-sampled frame by up-sampling the lower-resolution frame, the up-sampled frame having the first resolution; and generate a second additional higher-resolution frame based on a weighted average of the up-sampled frame and the first additional higher-resolution frame, wherein the weighted average is based on the plurality of weights, wherein:

the second additional higher-resolution frame corresponds to the particular output time, and the one or more processing circuits are configured such that, as part of generating the second additional higher-resolution frame, the one or more processing circuits determine, for each sample in the third block, based on the weight for the set of corresponding blocks, a sample in the second additional higher-resolution frame as a weighted average of the sample in the third block and a corresponding sample in the fourth block.

10. The device of claim 9, further comprising a display device configured to display the plurality of original higher-resolution frames and the second additional higher-resolution frame.

11. The device of claim 9, wherein the one or more processing circuits are configured such that, as part of determining the sample in the second additional higher-resolution frame, the one or more processing circuits determine the sample in the second additional higher-resolution frame such that the sample in the second additional higher-resolution frame is equal to $(w \cdot s_1 + (1-w) \cdot s_2)$, where w is the weight, $s_1$ is the sample in the third block, and $s_2$ is the sample in the fourth block.

12. The device of claim 9, wherein the one or more processing circuits are configured such that, as part of generating the first additional higher-resolution frame, the one or more processing circuits:

extrapolate the first additional higher-resolution frame from the plurality of original higher-resolution frames.

13. The device of claim 12, wherein the particular output time is an output time of the first additional higher-resolution frame, and the one or more processing circuits are configured such that, as part of extrapolating the first additional higher-resolution frame, the one or more processing circuits:

partition a first original higher-resolution frame of the plurality of original higher-resolution frames into a plurality of blocks; and for each respective block in the plurality of blocks of the first original higher-resolution frame:

search for a corresponding block in a second original higher-resolution frame of the plurality of original higher-resolution frames;

determine a motion vector indicating a spatial difference from the corresponding block in the second original higher-resolution frame to the respective block of the first original higher-resolution frame;

scale the motion vector based on a temporal difference between an output time of the first original higher-resolution frame and the output time of the first additional higher-resolution frame; and include the corresponding block in the first additional higher-resolution frame at a location indicated by the scaled motion vector.

14. The device of claim 9, wherein the one or more processing circuits are configured such that, as part of generating the first additional higher-resolution frame, the one or more processing circuits:

interpolate the first additional higher-resolution frame from the plurality of original higher-resolution frames.

15. The device of claim 9, wherein the one or more processing circuits are configured such that, as part of interpolating the first additional higher-resolution frame, the one or more processing circuits:

partition a first original higher-resolution frame of the plurality of original higher-resolution frames into a plurality of blocks;

for each respective block in the plurality of blocks of the first original higher-resolution frame:

search for a corresponding block in a second original higher-resolution frame of the plurality of original higher-resolution frames;

determine a motion vector indicating a spatial difference from the corresponding block in the second original higher-resolution frame to the respective block of the first original higher-resolution frame;

scale the motion vector based on a temporal difference between an output time of the first original higher-resolution frame and the output time of the first additional higher-resolution frame; and generate a prediction block based on a weighted average of the respective block in the first original higher-resolution frame and the corresponding block in the second original higher-resolution frame; and include the prediction block in the first additional higher-resolution frame at a location indicated by the scaled motion vector.

16. The device of claim 9, wherein the blocks of the lower-resolution frame and the blocks of the down-sampled frame are each 2×2 or larger.

17. A device comprising:
  means for storing a plurality of original higher-resolution frames and a lower-resolution frame, each of the plurality of original higher-resolution frames having a first resolution, the lower-resolution frame having a second resolution lower than the first resolution;
  means for generating, based on the plurality of original higher-resolution frames, a first additional higher-resolution frame, the first additional higher-resolution frame having the first resolution, the first additional higher-resolution frame and the lower-resolution frame corresponding to a same particular output time;
  means for generating a down-sampled frame by down-sampling the first additional higher-resolution frame, the down-sampled frame having the second resolution, wherein:
    a set of corresponding blocks includes a first block, a second block, a third block, and a fourth block, the first block being in the down-sampled frame, the second block being in the lower-resolution frame, the third block being in an up-sampled frame, and the fourth block being in the first additional higher-resolution frame, and
    the first block, the second block, the third block, and the fourth block correspond to a same region of an image represented in the down-sampled frame, the lower-resolution frame, the up-sampled frame, and the first additional higher-resolution frame;
  means for determining, based on comparisons of blocks of the lower-resolution frame and blocks of the down-sampled frame, a plurality of weights, wherein the means for determining the plurality of weights comprises:
    means for determining a difference metric that indicates a degree of difference between the first block and the second block; and
    means for determining, based on the difference metric, a weight for the set of corresponding blocks, the weight for the set of corresponding blocks being one of the weights in the plurality of weights;
  means for generating the up-sampled frame by up-sampling the lower-resolution frame, the up-sampled frame having the first resolution; and
  means for generating a second additional higher-resolution frame based on a weighted average of the up-sampled frame and the first additional higher-resolution frame, wherein:
    the weighted average is based on the plurality of weights, wherein the second additional higher-resolution frame corresponds to the particular output time, and
    the means for generating the second additional higher-resolution frame comprises means for determining, for each sample in the third block, based on the weight for the set of corresponding blocks, a sample in the second additional higher-resolution frame as a weighted average of the sample in the third block and a corresponding sample in the fourth block.

18. A non-transitory computer-readable data storage medium having instructions stored thereon that, when executed, cause one or more processing circuits to:
  obtain a plurality of original higher-resolution frames and a lower-resolution frame, each of the plurality of original higher-resolution frames having a first resolution, the lower-resolution frame having a second resolution lower than the first resolution;
  generate, based on the plurality of original higher-resolution frames, a first additional higher-resolution frame, the first additional higher-resolution frame having the first resolution, the first additional higher-resolution frame and the lower-resolution frame corresponding to a same particular output time;
  generate a down-sampled frame by down-sampling the first additional higher-resolution frame, the down-sampled frame having the second resolution, wherein:
    a set of corresponding blocks includes a first block, a second block, a third block, and a fourth block, the first block being in the down-sampled frame, the second block being in the lower-resolution frame, the third block being in an up-sampled frame, and the fourth block being in the first additional higher-resolution frame, and
    the first block, the second block, the third block, and the fourth block correspond to a same region of an image represented in the down-sampled frame, the lower-resolution frame, the up-sampled frame, and the first additional higher-resolution frame;
  determine, based on comparisons of blocks of the lower-resolution frame and blocks of the down-sampled frame, a plurality of weights, wherein as part of causing the one or more processing circuits to determine the plurality of weights, execution of the instructions causes the one or more processing circuits to:
    determine a difference metric that indicates a degree of difference between the first block and the second block; and
    determine, based on the difference metric, a weight for the set of corresponding blocks, the weight for the set of corresponding blocks being one of the weights in the plurality of weights;
  generate the up-sampled frame by up-sampling the lower-resolution frame, the up-sampled frame having the first resolution; and
  generate a second additional higher-resolution frame based on a weighted average of the up-sampled frame and the first additional higher-resolution frame, wherein:
    the weighted average is based on the plurality of weights, wherein the second additional higher-resolution frame corresponds to the particular output time, and
    as part of causing the one or more processing circuits to generate the second additional higher-resolution frame, execution of the instructions causes the one or more processing circuits to determine, for each sample in the third block, based on the weight for the set of corresponding blocks, a sample in the second additional higher-resolution frame as a weighted average of the sample in the third block and a corresponding sample in the fourth block.

* * * * *